US010813072B1

(12) United States Patent
Reyes et al.

(10) Patent No.: US 10,813,072 B1
(45) Date of Patent: Oct. 20, 2020

(54) PROXIMITY SERVICES

(71) Applicant: MicroStrategy Incorporated, Vienna, VA (US)

(72) Inventors: Benjamin Reyes, Great Falls, VA (US); Hugh Owen, Arlington, VA (US); Jose Nocedal de la Garza, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 40 days.

(21) Appl. No.: 16/017,087

(22) Filed: Jun. 25, 2018

Related U.S. Application Data

(63) Continuation of application No. 14/793,163, filed on Jul. 7, 2015, now Pat. No. 10,009,868.

(60) Provisional application No. 62/021,564, filed on Jul. 7, 2014.

(51) Int. Cl.
*H04W 64/00* (2009.01)
*G06Q 30/02* (2012.01)
*H04W 72/04* (2009.01)
*H04W 4/02* (2018.01)

(52) U.S. Cl.
CPC ........ *H04W 64/00* (2013.01); *G06Q 30/0261* (2013.01); *H04W 4/02* (2013.01); *H04W 72/048* (2013.01)

(58) Field of Classification Search
CPC .................................................... H04W 64/00
See application file for complete search history.

(56) References Cited

U.S. PATENT DOCUMENTS

| 6,774,765 | B1 | 8/2004 | Goodwin, III |
| 7,039,628 | B2 | 5/2006 | Logan, Jr. |
| 7,319,386 | B2 | 1/2008 | Collins, Jr. |
| 8,781,502 | B1 | 7/2014 | Middleton |
| 8,799,009 | B2 | 8/2014 | Mellin |
| 10,009,868 | B1 | 6/2018 | Reyes |
| 10,445,777 | B2 * | 10/2019 | McDevitt ........... G06Q 30/0261 |
| 2006/0049936 | A1 | 3/2006 | Collins, Jr. |
| 2008/0067244 | A1 * | 3/2008 | Marks .................... G01V 15/00 235/385 |
| 2009/0184823 | A1 * | 7/2009 | Tessier ...................... G01S 5/16 340/568.1 |
| 2012/0323691 | A1 * | 12/2012 | McLaughlin ............ G07C 9/20 705/14.58 |

(Continued)

OTHER PUBLICATIONS

Office Action issued in U.S. Appl. No. 14/793,345 dated Aug. 10, 2016, 41 pages.

(Continued)

*Primary Examiner* — Vladimir Magloire
*Assistant Examiner* — Donald HB Braswell
(74) *Attorney, Agent, or Firm* — Fish & Richardson P.C.

(57) ABSTRACT

Method, systems, and computer-readable media for receiving, from an application instance operating on a client device, information that indicates a client device identifier, a wireless proximity beacon identifier, and a proximity of the identified client device to the identified wireless proximity beacon. From the received information, a determination is made whether the proximity of the identified client device to the identified wireless proximity beacon satisfies a threshold proximity. Based at least on the determination, an action is determined that the application instance operating on the identified client device is permitted to perform while the proximity of the identified client device to the identified wireless proximity beacon satisfies the threshold proximity. Information is transmitted to the identified client device that enables the application instance operating on the identified client device to perform the action.

20 Claims, 10 Drawing Sheets

(56) References Cited

U.S. PATENT DOCUMENTS

| | | |
|---|---|---|
| 2013/0267253 A1 | 10/2013 | Case |
| 2014/0002236 A1 | 1/2014 | Pineau |
| 2014/0113560 A1* | 4/2014 | Graube .................. H04B 7/26 455/41.2 |
| 2014/0244819 A1 | 8/2014 | Patrick |
| 2014/0335893 A1* | 11/2014 | Ronen .................. G01S 5/0252 455/456.1 |
| 2015/0181383 A1 | 6/2015 | Schulz |
| 2015/0351008 A1 | 12/2015 | Mayor |

OTHER PUBLICATIONS

Office Action issued in U.S. Appl. No. 14/793,489 dated Jan. 11, 2016, 10 pages.
Notice of Allowance issued in U.S. Appl. No. 14/793,489 dated Apr. 29, 2016, 8 pages.
Office Action issued in U.S. Appl. No. 15/250,396 dated Oct. 20, 2016, 12 pages.
Notice of Allowance issued in U.S. Appl. No. 15/250,396 dated Jun. 15, 2017, 5 pages.
Office Action issued in U.S. Appl. No. 14/793,478 dated Aug. 10, 2016, 27 pages.
Office Action issued in U.S. Appl. No. 14/793,478 dated Apr. 4, 2017, 38 pages.
Notice of Allowance issued in U.S. Appl. No. 14/793,163 dated Feb. 28, 2018, 8 pages.
Office Action issued in U.S. Appl. No. 14/793,163 dated Jun. 27, 2016, 39 pages.
Office Action issued in U.S. Appl. No. 14/793,163 dated Mar. 23, 2017, 47 pages.

* cited by examiner

PROXIMITY SERVICES

CROSS-REFERENCE TO RELATED APPLICATIONS

This application is a continuation (and claims the benefit of priority under 35 USC 120) of U.S. application Ser. No. 14/793,163, filed Jul. 7, 2015, now allowed, which claims the benefit of U.S. Provisional Application Ser. No. 62/021,564, filed Jul. 7, 2014, and titled "Proximity Services." Both of these prior applications are incorporated by reference in their entirety.

TECHNICAL FIELD

This disclosure relates generally to providing location-based information or services.

BACKGROUND

The physical locations of mobile devices can be determined using various techniques. Information or other services can be provided to users of client devices based on the physical location of the user's client device.

DETAILED DESCRIPTION

Figure 1:
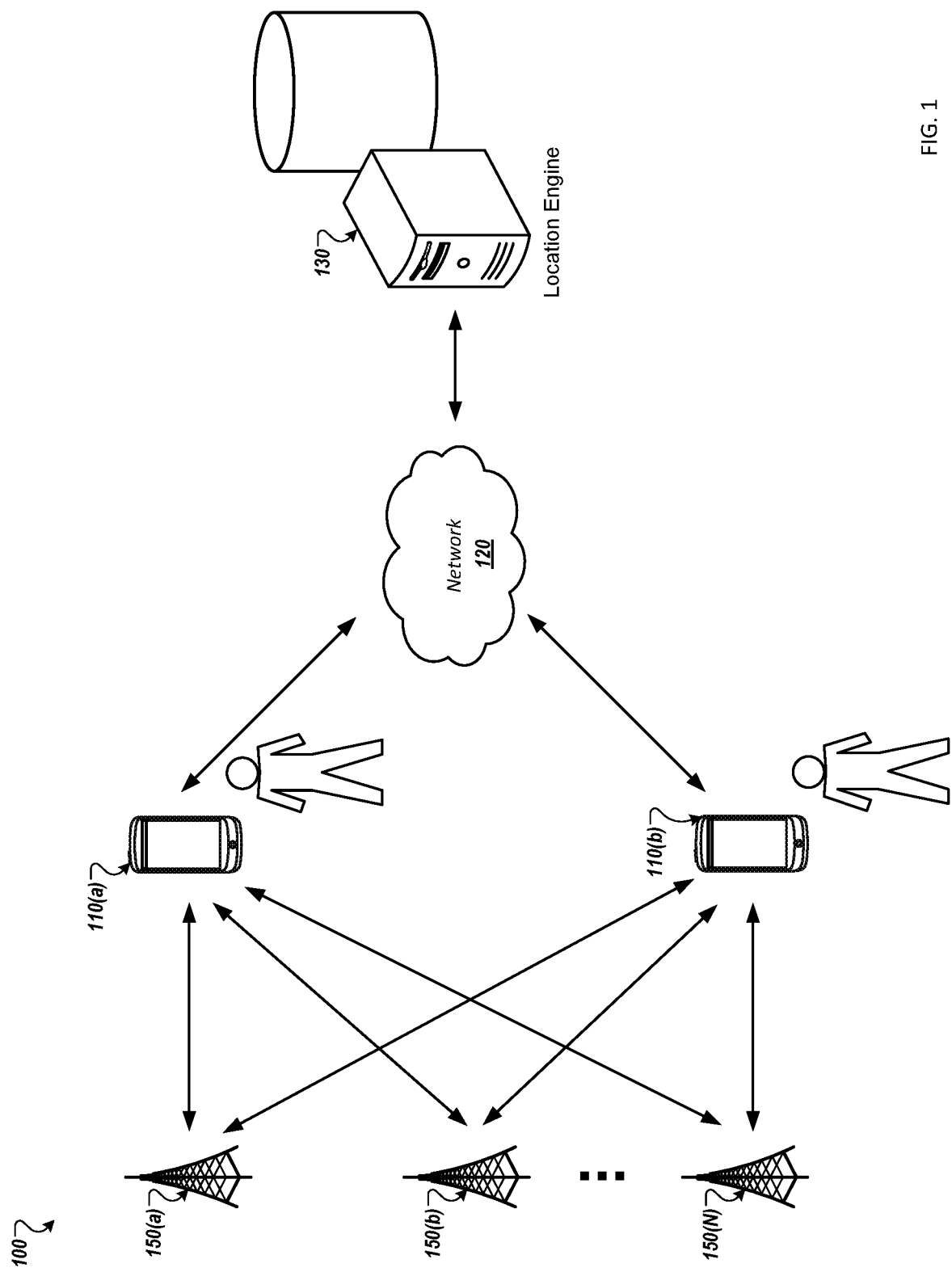
FIG. 1 illustrates an example system for providing proximity services using proximity detection technology.

Techniques are described for providing location-based services by utilizing proximity detection technology. A proximity detection system that includes one or more wireless sensor beacons can determine a client device's location based on the client device's proximity to one or more of the beacons. Based on the location of a particular client device, information can be provided to the client device, or other functionalities can be made accessible to the client device. Additionally, the locations of one or more client devices can be tracked and/or reported to one or more external systems, e.g., servers, such that the location information can be analyzed to determine various location statistics. For example, the proximity detection system can track the locations and/or movements of one or more client devices over time. The location statistics can further be combined with other information, such as user profile information associated with users of the one or more client devices, such that information in addition to the location information may be provided to users of the one or more client devices.

In some implementations, a proximity detection system is associated with a particular region, such as a building, venue, outdoor area, or other space, and includes one or more wireless sensor beacons. Each of the wireless sensor beacons is capable of emitting information identifying a particular beacon. A client device associated with a user can include software that is capable of detecting the presence of the wireless sensor beacons. Based on detecting the presence of one or more wireless sensor beacons, the client device can determine the client device's proximity to the one or more beacons. This proximity information can then be used to estimate the location of the user's client device relative to the one or more beacons.

In some implementations, each of the wireless sensor beacons is associated with a particular geographical location (e.g., latitude and longitude coordinates). As a result, determining the proximity of the client device to the one or more beacons enables for an estimation of a physical location of the client device. For example, the proximity detection system can estimate the location of a client device based on the client device's proximity to a particular beacon, or can be estimated using a trilateration or other multilateration process in which the client device's location is estimated based on the client device's proximity to three particular beacons. Other methods for estimating the location of a client device based on the proximity to one or more beacons are also possible.

Location information and/or other information (e.g., information associated with a user of a client device) can be exchanged between a client device and one or more servers that are accessible over a network. Location information can be tracked, for example, by storing a history of client device locations on a server, and statistical information can be determined regarding the locations and/or movements of one or more client devices. Information from the one or more servers can also be provided to one or more of the client devices over a network. Information provided to the client devices may be based at least in part on a location of the client device, or may be information provided based on detecting other events. In practice, other operations can be performed using a proximity detection system to locate one or more client devices. For example, various implementations can involve the use of a proximity detection system to provide location-based services in a tradeshow or networking event setting, an office building or office setting, a stadium or other event venue, a museum or zoo, a transportation hub such as an airport or train station, a casino setting, an amusement park, etc.

FIG. 1 illustrates an example of a proximity detection system 100 configured to provide location-based services by utilizing proximity detection technology. The proximity detection system 100 includes one or more client devices 110(*a*)-(*b*), a network 120, a location engine 130, and one or more wireless sensor beacons 150(*a*)-(N). The network 120 enables communication between the one or more client devices 110(*a*)-(*b*) and the location engine 130. The one or more client devices 110(*a*)-(*b*) are capable of communicating with the one or more wireless sensor beacons 150(*a*)-(N) using techniques described herein.

The wireless sensor beacons 150(*a*)-(N) can be devices capable of emitting and/or receiving information over a wireless communication channel. For example, the wireless sensor beacons 150(*a*)-(N) can utilize Bluetooth Low Energy (BLE), also known as Bluetooth Smart, or other wireless technologies, e.g., Wi-Fi, near-field communications (NFC), or other wireless technologies, to communicate with the client devices 110(*a*)-(*b*). The wireless sensor beacons 110(a)-(N) may be commercially available beacon devices, for example, iBeacon devices as made available by Apple Inc., Gimbal Proximity Beacons as made available by Qualcomm Incorporated, PayPal Beacon devices as made available by PayPal, or other devices. The wireless sensor beacons 150(a)-(N) can communicate with client devices 110(a)-(b) by emitting messages (e.g., pings) that include information identifying the beacons 150(a)-(N). In some implementations, client devices 110(a)-(b) can communicate with the wireless sensor beacons 150(a)-(N) by receiving messages from the wireless sensor beacons 150(a)-(N) that identify one or more of the wireless sensor beacons 150(a)-(N).

In some implementations, for example, each of the wireless sensor beacons 150(a)-150(N) is associated with identification information that identifies a particular wireless sensor beacon or group of two or more wireless sensor beacons. In some instances, a particular wireless sensor beacon may be associated with multiple identifiers that identify one or more groups of wireless sensor beacons that each includes the particular wireless sensor beacon, and/or an identifier that identifies the particular wireless sensor beacon within the one or more groups of wireless sensor beacons. In some implementations, the beacons 150(a)-(N) may all be associated with the same unique universal identifier (UUID). As an example, each of the beacons 150(a)-(N) may be associated with a particular building, and may therefore all be associated with the same UUID to indicate that all of the wireless sensor beacons 150(a)-(N) are associated with the same building. Additionally, a subset of wireless sensor beacons, for example, the wireless sensor beacons 150(a) and 150(b), may be associated with a second identifier that may be termed a major identifier. This identifier may identify a smaller subset of the wireless sensor beacons 150(a)-(N), for example, to indicate that all of the wireless sensor beacons 150(a)-(N) sharing the same UUID are associated with the same building, and that the wireless sensor beacons 150(a) and 150(b) are on the same floor of the building. Another identifier, termed a minor identifier, may identify a particular wireless sensor beacon within the one or more groupings of wireless sensor beacons. For example, the wireless sensor beacons 150(a) and 150(b) that have the same UUID and major identifier may have unique minor identifiers to distinguish the wireless sensor beacon 150(a) from the wireless sensor beacon 150(b). In some implementations, the UUID, major identifier, minor identifier, or other identifiers associated with one or more wireless sensor beacons may be alphanumeric identifiers, or may include other information or data, e.g., a data packet that is unique to a particular wireless sensor beacon or group of wireless sensor beacons.

The identifiers used to identify wireless sensor beacons may be associated with geographical locations or other defined regions. For example, an identifier may be associated with a particular set of latitude and longitude coordinates, may be associated with a defined region (e.g., a particular building, room of a building, venue, outdoor area, or other space), or may be defined in another way, for example, based on a function of the defined region (e.g., an office space versus a dining area). The wireless sensor beacons 150(a)-(N) of FIG. 1, for example, may each be associated with a UUID, a major identifier, and a minor identifier. The UUID may be shared by all of the beacons 150(a)-(N) and may be associated with a region corresponding to a particular building (e.g., a set of latitude and longitude coordinates that define the area covered by the building). A major identifier may be shared by a subset of wireless sensor beacons, such as the wireless sensor beacons 150(a) and 150(b), and be associated with another location, for example, a set of latitude and longitude coordinates for a particular department within the particular building. The minor identifier of each of the wireless sensor beacons 150(a)-150(N) may be unique to each wireless sensor beacon, and may be associated with a particular geographical location that defines the precise location of a wireless sensor beacon. For example, each wireless sensor beacon 150(a)-(N) would have a unique minor identifier that each are associated with a different geographical location. In some implementations, only one or a subset of the identifiers may be associated with a physical location. For example, each of the minor identifiers that identify individual wireless sensor beacons may be associated with a physical location (e.g., latitude and longitude), while a UUID or major identifier that is shared by multiple wireless sensor beacons may not.

Each of the wireless sensor beacons 150(a)-(N) can broadcast information to allow client devices 110(a)-(b) to recognize one or more of the wireless sensor beacons 150(a)-(N). In some instances, wireless sensor beacons broadcast their information periodically, for example, every second, every 100 milliseconds, every minute, etc. The wireless sensor beacons 150(a)-(N) can broadcast this information using the wireless communications protocol that the wireless sensor beacon is configured to use (e.g., Bluetooth Low Energy). In some implementations, the information broadcast by a wireless sensor beacon can be broadcast with a particular broadcast frequency or power level. The information broadcast by a wireless sensor beacon can have a predefined format. For example, the information broadcast by each of the wireless sensor beacons 150(a)-(N) may utilize the same format that includes the wireless sensor beacons' UUID, major identifier, and/or minor identifier (e.g., in a particular order or using a particular hashing method). Information broadcast by the wireless sensor beacons may take other forms as well, for example, pings or other information. The information periodically broadcast by the wireless sensor beacons 150(a)-(N) can be received by the client devices 110(a)-(b) such that the client devices 110(a)-(b) can detect the presence of and/or the identity of one or more of the wireless sensor beacons 150(a)-(N).

The one or more client devices 110(a)-(b) are devices that host one or more applications, for example, one or more applications associated with providing location-based services using proximity detection technology. The one or more client devices 110(a)-(b) can be cellular devices or non-cellular locally networked devices. The client devices 110(a)-(b) can include a cell phone, a smart phone, a tablet PC, a personal digital assistant ("PDA"), or any other stationary or portable device configured to communicate with the mobile sensor beacons 150(a)-(N) and to communicate over a network, such as the network 120. For example, implementations can include iPhone-type devices, e.g., as provided by Apple Inc., BlackBerry-type devices, e.g., as provided by BlackBerry Ltd., iPod or iPad-type devices, e.g., as provided by Apple Inc., other portable music or media players, or other communication devices including other handled, portable, or stationary devices for gaming, communications, and/or data organization. The client devices 110(a)-(b) can be the same, or can be devices of different types. The one or more client devices 110(a)-(b) can perform functions unrelated to the proximity detection system 100, such as placing personal telephone calls, playing music, playing video, displaying pictures, browsing the Internet, maintaining an electronic calendar, modifying or organizing data, etc.

The client devices 110(a)-(b) can further be equipped to detect the presence of and/or receive information from the wireless sensor beacons 150(a)-(N). For example, the wireless sensor beacons 150(a)-(N) may be Bluetooth Low Energy devices, and the client devices 110(a)-(b) may be capable of detecting signals broadcast by, or receiving the information broadcast by, the wireless sensor beacons 150(a)-(N).

Upon detecting and/or receiving signals from one or more wireless sensor beacons 150(a)-(N), a client device 110(a)-(b) can perform additional operations to provide location-based services using proximity detection technology. For example, the client device 110(a) can receive information broadcast by the wireless sensor beacon 150(a). The client device 110(a) can use this information to identify the wireless sensor beacon 150(a), and can use the strength of the signal received from the wireless sensor beacon 150(a) to estimate the client device's 110(a) proximity to the wireless sensor beacon 150(a). Based on identifying the wireless sensor beacon 150(a) and the proximity of the client device 110(a) to the wireless sensor beacon 150(a), a location of the client devices 110(a) may be estimated. In some implementations, identifying the wireless sensor beacon 150(a) and/or estimating the physical location of the client device 110(a) based on the information broadcast by the wireless sensor beacon 150(a) can be performed by an application hosted by the client device 110(a). In other implementations, the client device 110(a) can exchange communications with another system, such as the location engine 130, to identify the wireless sensor beacon 150(a) and/or to estimate the physical location of the client device 110(a).

Each of the client devices 110(a)-(b) having an application instance for providing location-based services using the proximity detection system may be associated with an identifier that uniquely, and in some implementations anonymously, identifies each of the client devices 110(a)-(b). For example, when the application is installed on a particular client device, the proximity detection system may assign the particular client device, the application instance installed on the client device, or a user of the client device a unique identifier. The location proximity detection system can log information, such as location history information, for the client device using the unique identifier, such that the logged information is essentially anonymous. In other implementations, an identifier assigned by the proximity detection system may be linked to a particular user, a particular client device, a particular user profile (e.g., a social network profile), etc.

In some implementations, in order to reduce power consumption of the client devices 110(a)-110(b) while running the location-based services application, the client devices 110(a)-110(b) are operated in several different modes. For example, a client device can operate in a low-power, region monitoring mode until one or more of the wireless sensor beacons 150(a)-(N) are detected, and can then enter a ranging mode to identify one or more of the wireless sensor beacons 150(a)-(N) for the purposes of estimating a physical location of the client device.

For example, a client device 110(a) having an application for location-based services that utilize proximity detection technology can operate in a low-power, region monitoring mode. This mode may be active at all times that the client device 110(a) is active or powered on, may be active while the application is actively running (e.g., in the "foreground"), or while the application is running but is not active (e.g., in the "background"). In some instances, the application is running at all times while the client device 110(a) is powered on, such that the application may automatically launch at the time of device startup. In other instances, the application may not launch unless a user of the client device 110(a) provides input to launch the application. Other implementations are also possible, for example, where the application may automatically launch and remain running (e.g., either in the "foreground" or the "background") during a particular time of day (e.g., from the hours of 9:00 AM to 5:00 PM every day from Monday through Friday), or when the client device 110(a) is otherwise determined to be near an area of interest (e.g., based on a Global Positioning System (GPS) of the client device 110(a) indicating that they are near a location that is associated with a proximity detection system 100).

In some implementations, while operating in the region monitoring mode, the client device 110(a) can detect the presence of one or more wireless sensor beacons 150(a)-(N). For example, the client device 110(a) may detect the presence of a wireless sensor beacon 150(a)-(N) based on detecting a ping broadcast by a wireless sensor beacon 150(a)-(N), or based on detecting other information transmitted by the wireless sensor beacon 150(a)-(N), e.g., the wireless sensor beacon's 150(a)-(N) identifying information. The client device 110(a) may detect only the presence of the one or more wireless sensor beacons 150(a)-(N) such that the client device 110(a) does not identify a particular wireless sensor beacon 150(a)-(N) or group of wireless sensor beacons 150(a)-(N), but rather only that a wireless sensor beacon is within range. In other implementations, detection of the presence of one or more wireless sensor beacons 150(a)-(N) by the client device 110(a) can involve identifying a group of, or an individual, wireless sensor beacons 150(a)-(N). For example, the client device 110(a) can detect the presence of one or more wireless sensor beacons 150(a)-(N) while in region monitoring mode based on receiving information identifying a group of the wireless sensor beacons 150(a)-(N), such as a UUID or major identifier shared by a subset of the wireless sensor beacons 150(a)-150(N), or based on receiving information identifying a particular wireless sensor beacon 150(a)-(N), such as a particular minor identifier.

In some implementations, a client device can be configured to detect the presence of certain wireless sensor beacons while operating in region monitoring mode. For example, a client device 110(a)-110(b) can be configured to detect the presence of one or more wireless sensor beacons 150(a)-(N) that share the same identifier or that have a particular identifier, such as a particular UUID, major identifier, or minor identifier. As an example, the client device 110(a) may only be configured to detect the presence of wireless sensor beacons 150(a)-(N) that are associated with a particular UUID corresponding to a particular building. In other examples, the client device 110(a) may only be configured to detect the presence of wireless sensor beacons 150(a)-(N) that are associated with a particular region of a building and that are associated with a major identifier associated with that region of the building, or may be configured to only detect the presence of a particular wireless sensor beacon 150(a)-(N) that is associated with a particular minor identifier. Using these techniques, the client device 110(a)-(b) may remain in a low-power state for as much time as possible, only becoming active (i.e., ranging) when necessary. For example, using the region monitoring mode, the client device 110(a) may avoid ranging unless the client device 110(a) is in a region relevant to a user of the client device 110(a), or unless the client device 110(a) is in a location where the location-based services provided by the proximity detection system are available.

Based on detecting the presence of one or more wireless sensor beacons, a client device can transition from the low-power, region monitoring mode to a ranging mode. While in ranging mode, the client device can identify one or more wireless sensor beacons and can additionally obtain other information relevant to providing location-based services, such as by estimating the proximity of the client device to one or more of the identified wireless sensor beacons. For example, the client device 110(a) operating in region monitoring mode may detect the presence of the wireless sensor beacon 150(a) based on receiving data broadcast by the wireless sensor beacon 150(a) that includes a particular UUID associated with the wireless sensor beacon 150(a). In response, the client device 110(a) may enter ranging mode, and may identify one or more wireless sensor beacons 150(a)-(N). Identifying one or more wireless sensor beacons 150(a)-(N) while in ranging mode may involve receiving information identifying each, or a subset of, the wireless sensor beacons 150(a)-(N), for example, the UUID, major identifier, and/or minor identifier of the wireless sensor beacons 150(a)-(N). Additionally, the client device 110(a) may determine the signal strength of the signals received from one or more of the wireless sensor beacons 150(a)-(N). For example, the client device 110(a) may measure the absolute signal strength of the received signals (e.g., in Watts), or may measure the signal strength in other ways (e.g., as a ratio measured in decibel-Watts). In some implementations, each of the wireless sensor beacons 150(a)-(N) may emit signals at a predetermined or known power level, such that a proximity to a particular wireless sensor beacon may be estimated based on the difference between the transmitted signal power and the signal power received at a client device.

While, in most applications, the data transferred between the client devices 110(a)-(b) and the wireless sensor beacons 150(a)-(N) is limited to the exchange of wireless sensor beacon identifier information, in some implementations, other information may be exchanged between the client devices 110(a)-(b) and the wireless sensor beacons 150(a)-(N). For example, information exchanged may include information relating to the battery level of one or more of the wireless sensor beacons 150(a)-(N), error messages, preferences or settings, identifier information, information identifying a client device 110(a)-(b), information identifying a user or user profile associated with one or more client devices 110(a)-(b), or other information.

Based on identifying one or more wireless sensor beacons 150(a)-(N) and, in some implementations, obtaining data used to estimate the proximity to one or more of the wireless sensor beacons 150(a)-(N) (e.g., data indicating the strength of the received signals), the client device 110(a) can perform operations to estimate a location of the client device 110(a) or can determine other operations to perform. For example, the client device 110(a) can estimate its location based on receiving information identifying one or more wireless sensor beacons 150(a)-(N) and based on obtaining information used to determine the proximity of the client device 110(a) to the one or more wireless sensor beacons 150(a)-(N). The client device 110(a) can estimate this location based on accessing information defining a geographical location or region associated with one or more of the identified wireless sensor beacons 150(a)-(N) and the information used to determine the proximity to one or more of the wireless sensor beacons 150(a)-(N). This process is described in greater detail with respect to FIG. 2.

The client device 110(a) may determine other operations to perform based on receiving the information identifying one or more wireless sensor beacons 150(a)-(N) or a proximity to one or more of the wireless sensor beacons 150(a)-(N). For example, based on identifying one or more wireless sensor beacons 150(a)-(N) associated with a particular identifier, or based on determining a proximity to one or more particular wireless sensor beacons 150(a)-(N), the client device 110(a)-(b) can access particular information or content. For example, the client device 110(a)-(b) can determine information to provide to a user of the client device 110(a)-(b) based on the user's client device 110(a)-(b) being located near one or more particular wireless sensor beacons 150(a)-(N) or within a threshold proximity of one or more wireless sensor beacons 150(a)-(N). Other information may be accessed or other operations may be performed based on the received wireless sensor beacon information and/or information indicating the proximity to particular wireless sensor beacons. In some implementations, data accessed by a client device may be accessed locally at the client device, or operations performed by a client device may be performed locally at the client device. In other implementations, the client device may access information at a remote location, for example, at the location engine 130, or may cause operations to be performed at a location remote from the client device, for example, at the location engine 130.

When information is accessed or performed remotely from a particular client device 110(a)-(b), information may be exchanged between the client device and the location engine 130 using one or more networks 120. For example, a client device 110(a) can transmit data to the location engine 130 over the network 120 identifying one or more wireless sensor beacons 150(a)-(N) and/or the proximity of the client device 110(a) to one or more of the wireless sensor beacons 150(a)-(N). The location server 130 can receive the information from the client device 110(a), and in response can perform operations on the received information or provide information to the client device 110(a) over the network 120.

The network 120 is configured to enable electronic communications between devices connected to the network 120. For example, the network 120 can be configured to enable the exchange of electronic communications between the client devices 110(a)-(b) and the location engine 130.

The network 120 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 120 can include multiple networks or subnetworks, each of which can include, for example, a wired or wireless data pathway. The network 120 can include a circuit-switched network, a packet-switched data network, or any other delivery or tunneling mechanism for carrying data (e.g., data or voice communications). For example, the network 120 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 120 can include one or more networks that include wireless data channels and wireless voice channels. The network 120 can be a wireless network, a broadband network, or a combination of networks including a wireless network and a broadband network. In some implementations, the network 120 can include one or more individual networks.

The location engine 130 can include one or more servers and can communicate with the client devices 110(a)-(b) over the network 120. In some implementations, the location engine 130 can be able to access and store information, for example, information received from the client devices 110(a)-(b). Such information may include, for instance, information identifying the one or more client devices 110(a)-(b) (e.g., an identifier for the client devices 110(a)-(b)), estimated locations of the client devices 110(a)-(b), information identifying one or more wireless sensor beacons 150(a)-(N), information relating to the proximity of one or more wireless sensor beacons 150(a)-(N) to one or more client devices 110(a)-(b), information associated with user or device profiles associated with the client devices 110(a)-(b), etc. In some instances, the location engine 130 can access other information that is available at one or more other servers that are in communication with the location engine 130, or information that is otherwise accessible, e.g., over the network 120. Such information may include information or content to provide to the client devices 110(a)-(b), or can include other information. In some implementations, the location engine 130 can receive information from one or more sources and can perform analysis on the received information. For example, the location engine 130 may be able to identify particular content to provide to the client device 110(a) based on receiving information indicating, or otherwise determining, a location of the client device 110(a).

In some implementations, the location engine 130 can also store information relevant to location-based services provided by the proximity detection system. For example, the location engine 130 may receive information from the client device 110(a) that identifies one or more particular wireless sensor beacons 150(a)-(N) and a proximity of the client device 110(a) to the particular wireless sensor beacons 150(a)-(N), and can estimate the physical location (e.g., latitude and longitude) of the client device 110(a) at the particular time when the data was received and/or obtained by the client device 110(a). The location engine 130 can store information tracking the location of the client device 110(a) and/or other client devices 110(a)-(b) over time and can perform additional analysis on the location data, where the results of such analysis may also be stored by the location engine 130.

Figure 2:
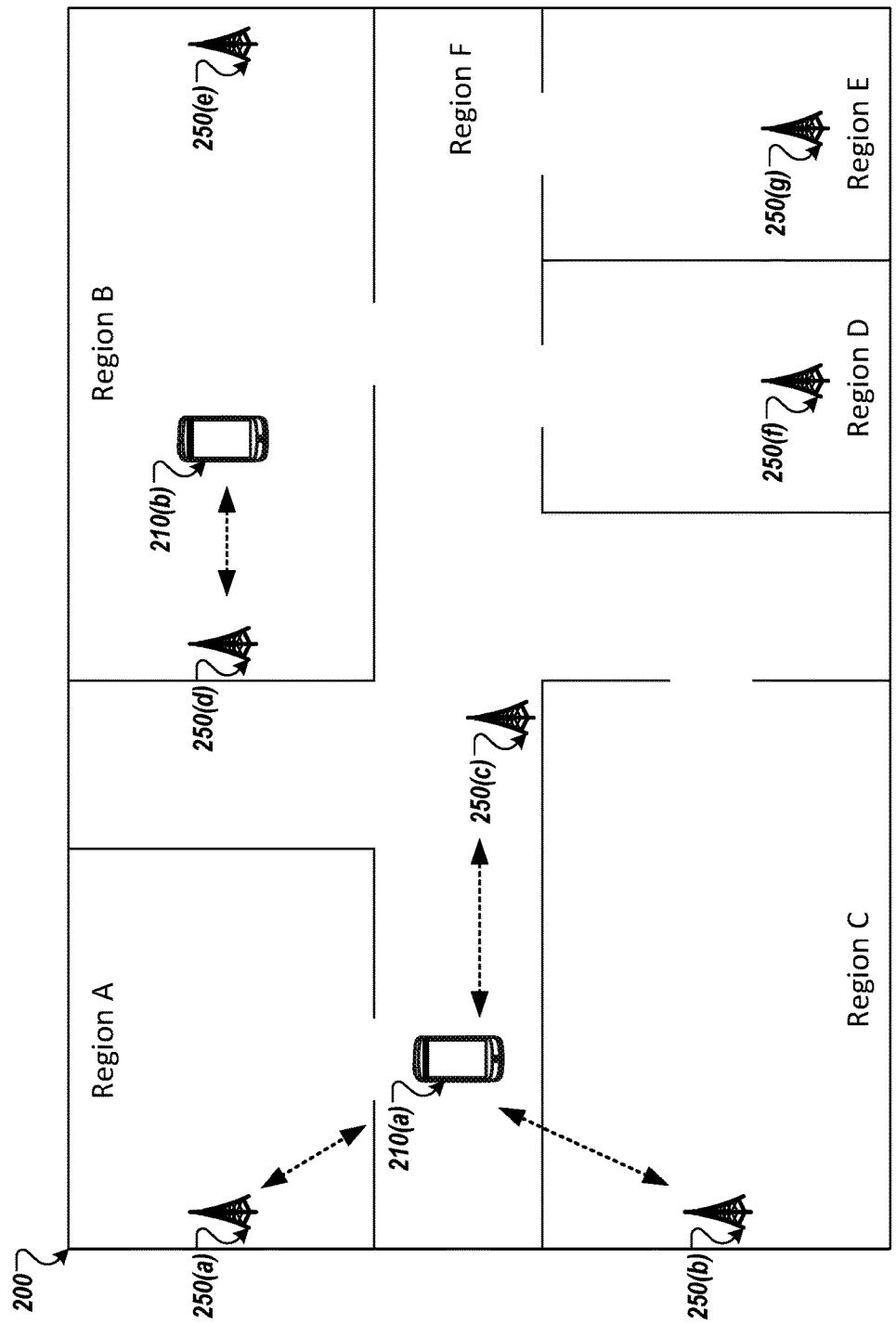
FIG. 2 depicts an example system for using proximity detection technology to determine a physical client device location.

FIG. 2 illustrates an example implementation in which the proximity detection system of FIG. 1 is used to estimate the location of one or more client devices. As shown in FIG. 2, a space 200 can be divided into several regions. For instance, the space 200 is shown divided into regions A through F. The space 200 may be, for example, a building, a particular floor of a building, a venue (e.g., stadium, concert hall, festival, etc.), an outdoor area (e.g., a park, a city, etc.), or any other space. The space 200 can be associated with multiple wireless sensor beacons 250(a)-(g) that are positioned throughout the space 200. The multiple wireless sensor beacons 250(a)-(g) may be associated with identifier information that is shared across multiple wireless sensor beacons 250(a)-(g), such as a UUID or major identifier, and/or may be associated with identifier information that is unique to each of the wireless sensor beacons 250(a)-(g), such as unique minor identifiers.

Based on the space 200 being associated with the wireless sensor beacons 250(a)-(g), a location of the client devices 210(a)-(b) may be estimated. Each of the client devices 210(a)-(b) may host an application for providing location-based services using the proximity detection technology utilized by the proximity detection system. At a particular point in time, the client devices 210(a)-(b) may be running the application actively (in the "foreground"), in standby (in the "background"), or may not be running the application at all. The client devices 210(a)-(b) may further be operating in the low-power, region monitoring mode. While operating in this mode, the client devices 210(a)-(b) may detect the presence of one or more of the wireless sensor beacons 250(a)-(g). In some implementations, as described, the client devices 210(a)-(b) may detect the presence of any wireless sensor beacon regardless of it associated UUID, major identifier, or minor identifier. In other implementations, the client devices 210(a)-(b) may detect the presence only of particular wireless sensor beacons 250(a)-(g) that are associated with particular UUIDs, major identifiers, and/or minor identifiers. Based on detecting the presence of one or more wireless sensor beacons 250(a)-(g), the client devices 210(a)-(b) may enter ranging mode to identify one or more wireless sensor beacons 250(a)-(g) that are in range of the client devices 210(a)-(b).

While the client devices 210(a)-(b) are in ranging mode, information received and/or obtained by the client devices 210(a)-(b) can include information identifying particular wireless sensor beacons 250(a)-(g) (e.g., the UUID, major identifier, and minor identifier of each wireless sensor beacon 250(a)-(g) that is within range). The information received and/or obtained by a particular client device 210(a)-(b) may further include information indicating, or that can be used to determine, the proximity of the particular client device 210(a)-(b) to particular wireless sensor beacons 250(a)-(g). For example, a client device 210(a) can obtain information indicating a strength of signal received from a particular wireless sensor beacon 250(a), and can use the signal strength information to determine the proximity of the client device 210(a) to the particular wireless sensor beacon 250(a). Alternatively, the client device 210(a) can receive information indicating the proximity of the client device 210(a) to the particular wireless sensor beacon 250(a). In such an implementation, the client device 210(a) may receive information indicating its proximity to the wireless sensor beacon 250(a) based on providing the location engine 130 information indicating the strength of a signal received from the wireless sensor beacon 250(a), where the location engine 130 can calculate the proximity of the wireless sensor beacon 250(a) to the client device 210(a) and provide information to the client device 210(a) indicating the client device's 210(a) proximity to the wireless sensor beacon 250(a). In some implementations, the wireless sensor beacons 250(a)-(g) can be calibrated to ensure that the determined proximity to a particular wireless sensor beacon is accurate.

Based on the information identifying the wireless sensor beacons 250(a)-(g) and the proximity of the wireless sensor beacons 250(a)-(g) to a particular client device 210(a)-(b), the location of a particular client device 210(a)-(b) can be estimated. In some implementations, the location of a client device can be estimated based on determining the closest wireless sensor beacon to the client device. In other implementations, the location of a client device can be estimated by using trilateration or by other methods that can provide estimates of locations based on an object's proximity to one or more other objects.

As an example, the location of the client device 210(b) may be estimated based on determining the closest wireless sensor beacon 250(a)-250(g) to the client device 210(b).

Upon detecting the presence of one or more wireless sensor beacons 250(a)-(g), that is, upon entering ranging mode, the client device 210(b) may identify and determine a proximity to one or more of the wireless sensor beacons 250(a)-(g). The client device 210(b) may then identify a particular wireless sensor beacon 250(d) to which it is the closest from among the wireless sensor beacons 250(a)-(g), for example, based on determining that the strength of the signal received from the wireless sensor beacon 250(d) is the strongest among the signals received by the wireless sensor beacons 250(a)-(g) that have been identified by the client device 210(b). The client device 210(b) may then estimate its proximity to the wireless sensor beacon 250(d) based on the received signal strength. In some implementations, estimating the location of the client device 210(b) can involve determining the proximity of the client device 210(b) to the wireless sensor beacon 250(d) multiple times (e.g., periodically), and using an average or running average of the multiple proximity measurements as the proximity of the client device 210(b) to the wireless sensor beacon 250(d). By averaging multiple proximity measurements, the proximity detection system can reduce the effects of interference or transient events that could influence the proximity measurements (e.g., a user opening or closing a door).

Based on determining the proximity of the client device 210(b) to the wireless sensor beacon 250(d), a geographical location or region associated with the closest wireless sensor beacon 250(d) can then be determined. For example, the client device 210(b) may store information that identifies the geographical location or region associated with each wireless sensor beacon 250(a)-(g), identified by their identifiers, and may access the information to determine the geographical location or region associated with the wireless sensor beacon 250(d). In other implementations, such information mapping the geographical locations or regions associated with the wireless sensor beacons 250(a)-(g) to the identifiers associated with those wireless sensor beacons 250(a)-(g) may be accessible by the client device 210(b) elsewhere, for example, at the location engine 130. Based on determining the most proximate wireless sensor beacon 250(d), the client device 210(b) (or alternatively the location engine 130) can estimate the location of the client device 210(b). For instance, the estimated location of the client device 210(b) may be a location that corresponds to the determined proximity from the wireless sensor beacon 250(d) in which the client device 210(b) could conceivably be located (e.g., not within a wall of a building). The client device 210(b) and/or the location engine 130 may then document the estimated location of the client device 210(b) at that particular point in time. For example, the client device 210(b) can locally store information logging the estimated location and the particular time, or can transmit information indicating the estimated location and the particular time to the location engine 130 for storage.

In another implementation, trilateration may be used to estimate the location of a client device, for example, the client device 210(a). Such a process enables the estimation of the absolute or relative location of the client device 210(a) based on the proximity of the client device 210(a) to three wireless sensor beacons of the wireless sensor beacons 250(a)-(g). In other implementations, a multilateration process may be used to estimate the location of a client device, where the multilateration process utilizes any number of two or more wireless sensor beacons to determine an approximate location of a client device. In some instances, the wireless sensor beacons selected to perform the trilateration or multilateration process can be those that are determined to be the closest to the client device 210(a), or the wireless sensor beacons selected to perform the trilateration process may be selected in a different way (e.g., the selected wireless sensor beacons may be preferred wireless sensor beacons). In some instances, selection of the wireless sensor beacons used to perform trilateration can be based on a previously estimated location of a client device. For example, based on determining that the client device 210(a) was previously located in region A of the space 200, the proximity detection system may select the wireless sensor beacons 250(a), 250(b), and 250(c) to perform trilateration. These wireless sensor beacons may be selected regardless of the detected signal strengths of the wireless sensor beacons. For example, even if the client device 210(a) determines that it received a stronger signal from the wireless sensor beacon 250(d) than it did from the wireless sensor beacon 250(b), the wireless sensor beacon 250(b) may be selected since it is closer to a previously estimated location of the client device 210(a). Additionally, in some instances, selection of the wireless sensor beacons used to perform the trilateration or other multilateration process is based on determining that certain geometries are preferable for determining the approximate location of a client device, for example, based on the detected angles between wireless sensor beacons and a client device.

In the example shown in FIG. 2 which uses a trilateration process to estimate a location of a client device, upon detecting the presence of one or more wireless sensor beacons 250(a)-(g), that is, upon entering ranging mode, the client device 210(a) may identify and determine a proximity to one or more of the wireless sensor beacons 250(a)-(g). The client device 210(a) may then select three of the identified wireless sensor beacons 250(a)-(g). For example, client device 210(a) may select the wireless sensor beacons 250(a), 250(b), and 250(c) that are determined to be the closest to the client device 210(a), based on detecting the proximity of the client device 210(a) to each of the wireless sensor beacons 250(a)-(g).

In other implementations, wireless sensor beacons 250(a)-(g) can be selected based on factors in addition to or in lieu of their proximity to the client device 210(a). For example, the proximity detection system may select a particular wireless sensor beacon based on the particular wireless sensor beacon being a preferred wireless sensor beacon or a wireless sensor beacon whose signal is not affected by obstacles or materials that the signal must travel through, e.g., walls. In some implementations, wireless sensor beacons may be selected based on the geometry formed by the wireless sensor beacons and a client device. For example, in performing trilateration, it is preferred that the angles formed by the wireless sensor beacons and the client device (e.g., with the client device forming the vertex of the angle) are acute angles or right angles. Thus, the selection of wireless sensor beacons may be based at least in part on determining wireless sensor beacons that form acute or right angles with the client device, such that wireless sensor beacons that form obtuse angles with the client device are not selected. In some implementations, the selection of wireless sensor beacons may consider multiple factors. For example, a particular wireless sensor beacon may be selected based on a combination of the detected signal strength of the wireless sensor beacon, the estimated proximity of the wireless sensor beacon to a client device, and the geometries (e.g., angles) formed between the particular wireless sensor beacon, the client device, and other wireless sensor beacons.

In some implementations, selecting wireless sensor beacons used to estimate the location of a client device may be dependent on determining that the signals received from one or more wireless sensor beacons satisfy a signal strength threshold. For example, a client device can determine the strength of the signals received from one or more wireless sensor beacons and can compare the detected signal strength to a signal strength threshold. If none of the detected signals meet the signal strength threshold, the proximity detection system may determine that a client device's location cannot be estimated, or may estimate the client device's location based on previous location estimates. For example, a location of a client device may be estimated based on a previous location estimate of the client device, an estimated speed and direction of movement of the client device, and/or historical movement data of the client device. If less than three of the identified wireless sensor beacons have detected signal strengths meeting the signal strength threshold, the proximity detection system may estimate the location of the client device based on the proximity of the client device to one (or both) of the wireless sensor beacons that have a received signal strength satisfying the threshold. This estimation may also be supplemented or adjusted based on previous estimates of the location of the client device, an estimated velocity or direction of movement for the client device, etc. If three or more of the identified wireless sensor beacons are determined to have received signal strengths satisfying the signal strength threshold, then wireless sensor beacons may be selected for estimation of the client device's location using trilateration. The selected wireless sensor beacons may be the wireless sensor beacons having the strongest received signal strength. In some implementations, the selection of wireless signal beacons to use in trilateration is dependent on the difference in the received signal strengths. For example, if the difference between the third strongest received signal and the fourth strongest or other received signal is above a certain threshold amount, then the three wireless sensor beacons with the strongest signals are selected for trilateration. If the difference in signal strength between the third strongest received signal and the fourth strongest or other received signal does not satisfy the threshold amount, then the wireless sensor beacons selected for trilateration may be a different set of wireless sensor beacons. For example, the wireless sensor beacons selected for trilateration can be selected from among the set of all wireless sensor beacons with received signal strengths that satisfy the signal strength threshold. The selection of the wireless sensor beacons may be determined based on geometric considerations (e.g., based on the angles formed between the wireless sensor beacons and the client device), based on a previously estimated location of the client device (e.g., based on determining which of the wireless sensor beacons are likely the closest to the client device), based on the relative signal strengths of the wireless sensor beacons, based on angles that would result in the trilateration calculation, or based on other factors. After selecting the wireless sensor beacons for trilateration, the proximity detection system can estimate the location of the client device using trilateration, and may also supplement and/or confirm the estimation of the client device's location with other information, for example, previously estimated locations, directions of movement, or rates of movement of the client device. In some implementations, the location estimate determined using any of the above methods may be further supplemented to confirm or adjust the location estimate, for example, by confirming that it is possible for the client device to be located in the estimated location.

Once the wireless sensor beacons 250(a), 250(b), and 250(c) have been selected and the identities and proximities of the selected wireless sensor beacons 250(a), 250(b), and 250(c) to the client device 210(a) have been determined, the location of the client device 210(a) may be estimated. For example, the geographical locations or regions associated with each of the wireless sensor beacons 250(a), 250(b), and 250(c) can be determined using techniques previously described, such as by accessing a lookup table mapping wireless sensor beacon identifier information to physical locations. A position of the client device 210(a) relative to the wireless sensor beacons 250(a), 250(b), and 250(c) can be estimated using trilateration. Based on the information indicating the physical locations or regions associated with the wireless sensor beacons 250(a), 250(b), and 250(c) and the position of the client device 210(a) relative to the wireless sensor beacons 250(a), 250(b), and 250(c), an estimate of the physical location of the client device 210(a) can be determined. The client device 210(a) and/or the location engine 130 may then document the estimated location of the client device 210(a) at that particular point in time.

In some implementations, estimating a physical location of a client device can utilize multiple estimates of the client device's physical location. For example, the proximity detection system may estimate the location of a client device by using both a multilateration process and by estimating the location based on the proximity of the client device to the nearest wireless sensor beacon to the client device. The proximity detection system may estimate the location of the client device based on the combination of these two estimates, for example, by averaging the two estimated locations. Determining the estimated location of a client device based on two or more estimates may consider other factors as well, for example, the estimated location of a client device may be based on averaging the multiple location estimates for the client device (e.g., taking the average of an estimated location determined by using a multilateration process and an estimated location determined using the closest wireless sensor beacon to the client device) and "snapping" that estimated location to a location where the client device could potentially be located. For example, if the average of two estimated locations for the client device is within a wall of a building, the proximity detection system can "snap" the location of the client device to a hallway next to the wall.

In some implementations, determining the proximity of a client device to a wireless sensor beacon can involve determining an estimated proximate distance of one to the other. For example, the client device 210(a) may determine that it is approximately 5 meters from the wireless sensor beacon 250(a). Such estimates may be dependent upon absorption of the signals broadcast by the wireless sensor beacons by other materials, such as the materials forming walls in a building. As a result of this phenomenon, it is possible that a wireless sensor beacon may be estimated as being further away from a client device than it actually is, since the signal received by the client device is weaker than it would typically be if not affected by its passing through other media, e.g., walls. In other implementations, determining the proximity of a client device to a wireless sensor beacon can involve classifying the client device as being immediate, e.g., from 0 to 3 meters, near, e.g., from 3 to 6 meters, or far, e.g., greater than 6 meters, from the wireless sensor beacon.

Additionally, as described, an application associated with a particular client device and/or the location engine 130 may maintain information that identifies locations within a space that a client device may be located. In such implementations, if an estimated location of a client device is determined to be a location in which the client device may not be located, the estimated location of the client device may be adjusted (e.g., "snapped") such that the estimated location is a permissible location. For example, the client device 210(*a*) and/or the location engine 130 may maintain a map of the space 200 of FIG. 2. If the estimated location of the client device 210(*a*) is determined to be within a wall of the space 200, such that the estimated location is not a possible location for the client device 210(*a*) to be located, the estimated location of the client device 210(*a*) may be "snapped to" or otherwise adjusted to a permissible location, e.g., the closest permissible location to the initially estimated location.

In some implementations, the wireless sensor beacons 250(*a*)-(*g*) may be reconfigurable, such that the proximity detection system can reconfigure the wireless sensor beacons 250(*a*)-(*g*) of the space 200. For example, if the proximity detection system determines that a particular wireless sensor beacon is not currently being used or is not used during specific hours of the day (e.g., that client devices do not identify the wireless sensor beacon during those hours), the proximity detection system may turn off the particular wireless sensor beacon or may turn off the wireless sensor beacon during the hours when the wireless sensor beacon is not used. In other examples, the proximity detection system may be able to monitor the accuracy and/or usefulness of a particular beacon. For example, if the proximity detection system determines that a particular wireless sensor beacon does not provide accurate location estimations, the proximity detection system can flag the wireless sensor beacon as needing to be moved or replaced. In other examples, the proximity detection system can determine that a particular wireless sensor beacon is largely redundant (e.g., is not necessary to providing accurate location estimates), and therefore may be better utilized by repositioning the wireless sensor beacon to a different area of a space, or that the wireless sensor beacon can be removed from the space. Reconfiguring the wireless sensor beacons within a space may allow for more accurate location estimating and/or more efficient use of resources including power usage and the deployment of available wireless sensor beacons.

Based on determining and tracking the estimated locations of one or more client devices within a particular space, various information can be determined about the space, the presence and distribution of users within the space, the movement of users throughout the space, and other spatial and/or temporal factors relating to the use of the space by one or more users.

Figure 3:
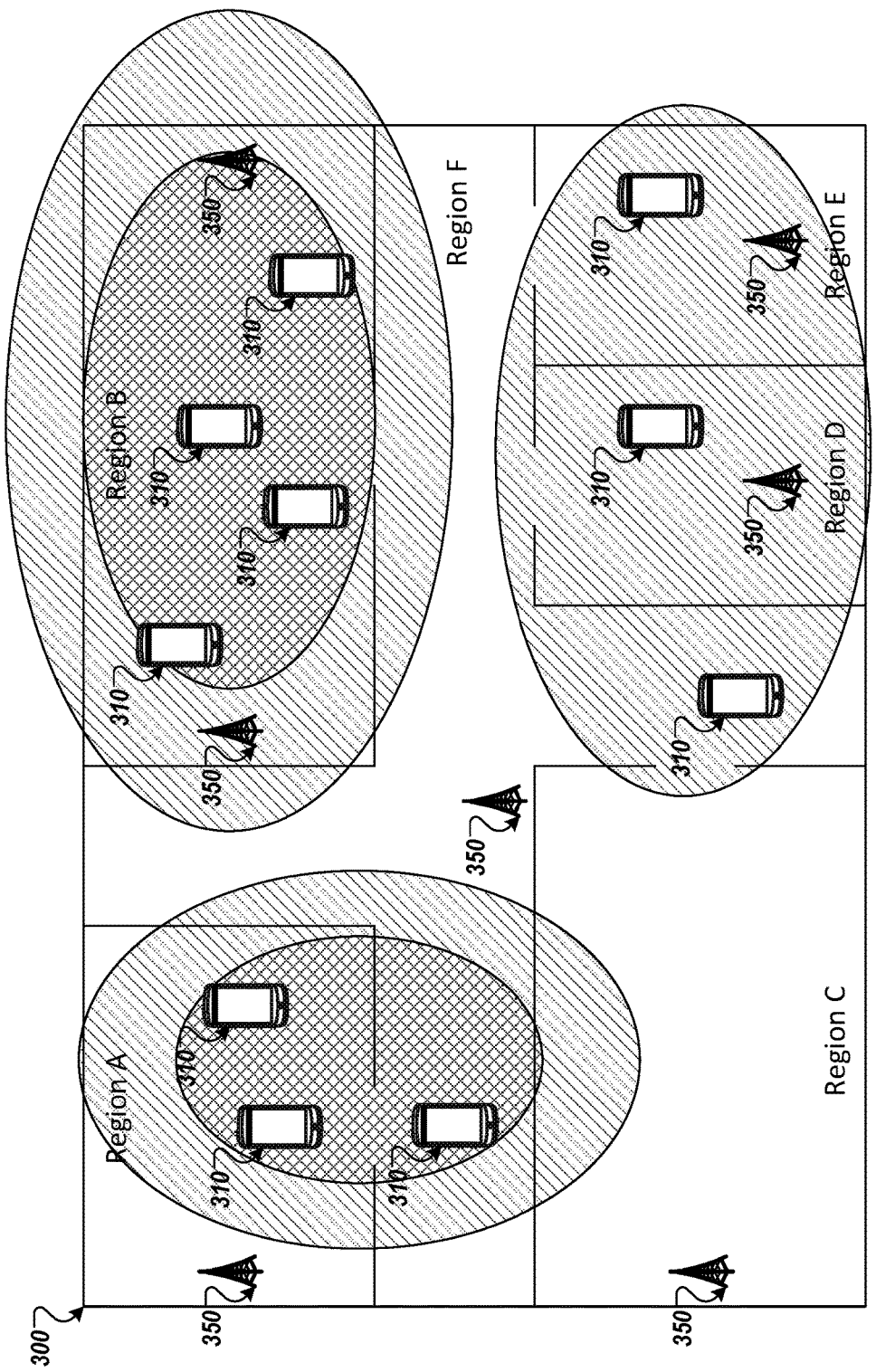
FIG. 3 depicts an example system for using proximity detection technology to determine client device population density.

FIG. 3 illustrates an example use of the estimated locations of one or more client devices, in which the estimated locations of multiple client devices is used to generate an occupation density map for the space. As shown in FIG. 3, the space 300 includes multiple wireless sensor beacons 350 that are positioned about the various regions A through F of the space 300. The space 300 is being occupied by multiple users each associated with a client device 310.

Using the described methods, the proximity detection system can estimate the locations of each of the client devices 310. Information identifying the estimated locations of each of the client devices 310 can be aggregated. For example, each of the client devices 310 can estimate their locations within the space 300 and can provide information to the location engine 130 identifying the estimated locations. In other implementations, each of the client devices 310 can transmit data to the location engine 130 identifying one or more wireless sensor beacons 350 and the proximity of a particular client device 310 to one or more of the wireless sensor beacons 350, and the location engine 130 can estimate the physical location of each of the client devices 310. Regardless of where the location estimation of each client devices 310 is performed, the information identifying the locations of the client devices 310 can be aggregated and analysis of the locations of the client devices 310 performed to determine the density of the client devices 310 in different areas or regions of the space 300. The location engine 130, one or more of the client devices 310, and or another system may then be able to access the aggregated location data for the space 300 to generate a graphic, such as that shown in FIG. 3, which illustrates the positions and density of the client devices 310 within the space 300.

In some instances, the density of client devices 310 within the space 300 may be determined by regions of the space 300. For example, the proximity detection system may determine the density of client devices 310 in each of regions A, B, C, D, E, and F separately. This density information may be presented graphically in a similar fashion as that shown in FIG. 3, and may further include presenting the estimated locations of one or more of the multiple client devices 310.

Figure 4:
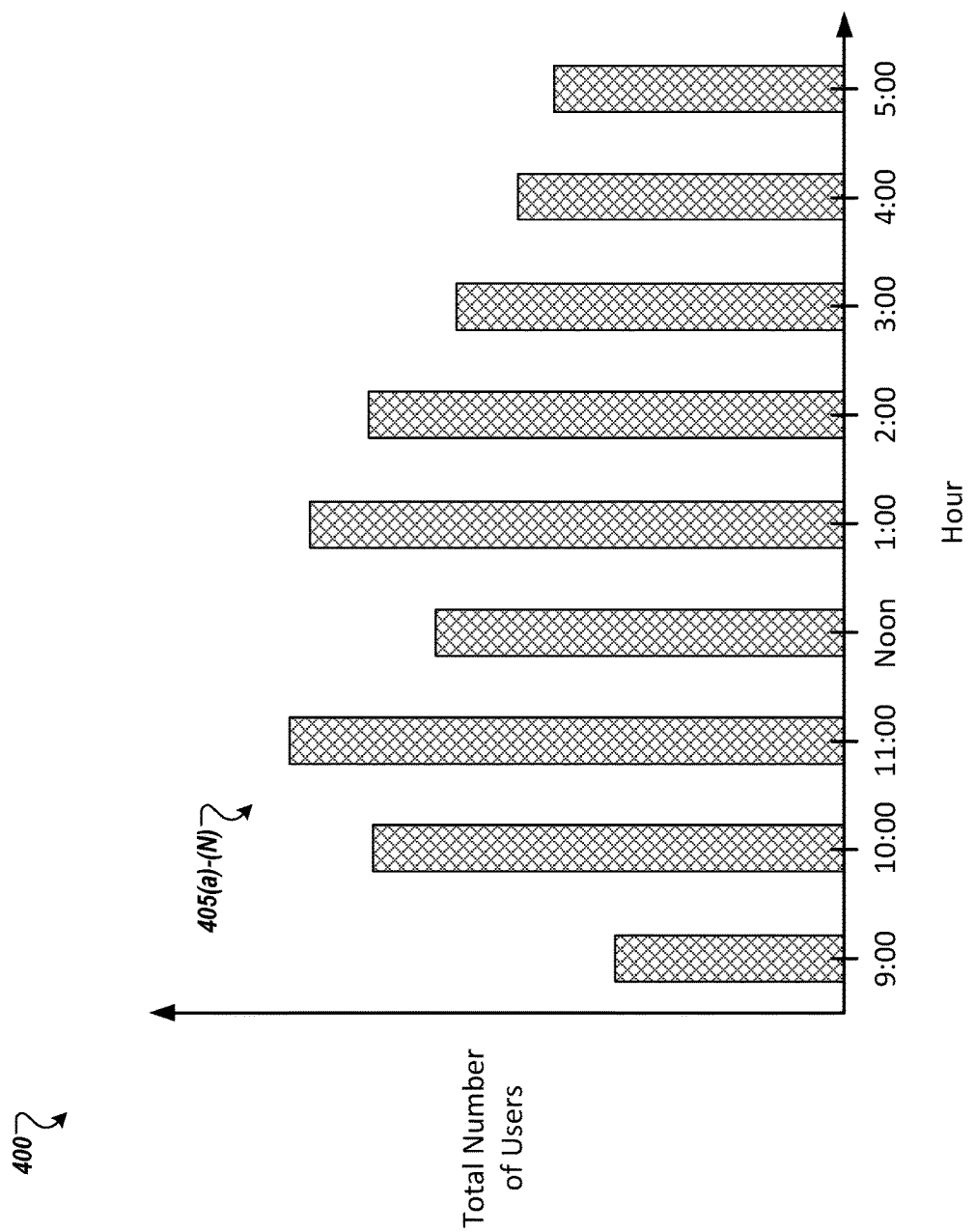
FIGS. 4-6 illustrate example analyses of data collected using proximity detection technology.

FIG. 4 illustrates a graphic in which the proximity detection system has tracked the presence of client devices within a space, or region of a space, over a period of time. For example, the graphic 400 may be a bar graph as shown, in which the graphic 400 describes the total number of unique client devices 310 present within the space 300 of FIG. 3 at various points in time.

Location information obtained from one or more client devices such as the client devices 310 may be received and/or determined for one or more points in time or time periods. For example, the location engine 130 may receive information from the client devices 310 of FIG. 3 that indicate the estimated locations of the client devices 310 at a particular point in time, e.g., at noon. The location engine 130 may determine the total number of client devices 310 present in the space 300 at the particular point in time, and may store information indicating the total number of client devices 310 present in the space 300 at the particular point in time. The location engine 130 may also receive and/or determine the total number of client devices present in the space 300 at other times, such as the number of client devices 310 in the space 300 at 9:00 AM, 10:00 AM, etc. In some implementations, the specific client devices detected as being located within the space 300 may change over time, for example, as users of the client devices 310 enter and exit the space 300. The location engine 130 can calculate the total number of client devices present in the space 300 for each of the selected time points, and can plot the total number of client devices present in the space 300 for each of the selected time points. The location engine 130 can plot the total number of client devices present in the space 300 over time using data points or graph bars 405(*a*)-(N) as shown in the graphic 400 of FIG. 4.

In some implementations, determining the total number of client devices present in a space can involve determining the total number of unique client devices that have been detected within the space for a predefined period, for example, the number of unique client devices 310 that have been detected in the space 300 from the time period extending from 11:00 AM to noon. Determining the total number of client devices present in the space during the time period may involve counting each client device only once during the time period, for example, such that any client device that was within the space during that period is counted, regardless of when the client device entered and/or exited the space during the time period, while also avoiding the counting of a particular client device within the space more than once for the time period.

Additionally, in some implementations, the graphic 400 may present information indicating the number of client devices located with a particular region of a property over time. For example, the graphic 400 may display the presence of client devices within region A of the space 300 over time. Additionally, while implementations described herein utilize the location engine 130 to perform the analysis required to produce the graphic of FIG. 4, in practice, other components of the proximity detection system may be utilized for such analysis. For example, a particular client device may receive information identifying the client devices present in a space or region of a space, and may compute the total number of client devices present in the space or in a region of the space at each of one or more time points or time periods. The client device may generate the graphic of FIG. 4 based on this analysis.

Figure 5:
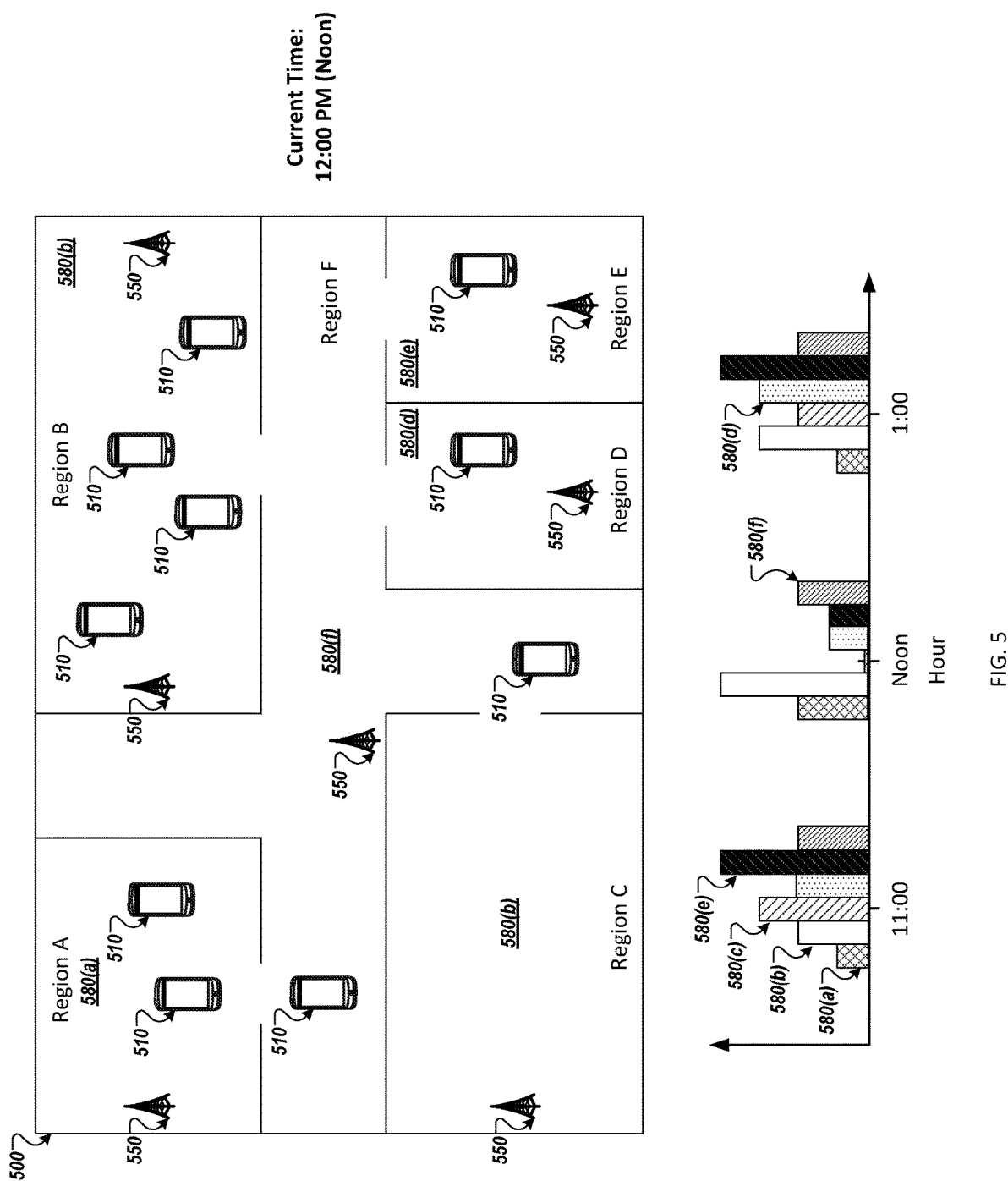

FIG. 5 illustrates another graphic that may be provided in association with the tracking of client devices 510 present within various regions 580(a)-(f) of the space 500. For example, the location engine 130 may receive information indicating the estimated locations of one or more client devices 510 at a particular point in time, for example, noon. Based on the estimated locations of the client devices 510, the location engine 130 may determine the number of client devices 510 present in one or more regions 580(a)-(f) of the space 500 at a particular time. The location engine 130 may then be able to produce a graphic that shows the estimated locations of the client devices 510 within the space 500 at the particular time. The location engine 130 may further be able to plot the number of client devices 510 within each region 580(a)-(f) of the space 500 over time. For example, FIG. 5 displays the estimated locations of client devices 510 within the space 500 at noon, and also displays a plot, shown in FIG. 5 as a bar graph, indicating the number of client devices 510 present in each region 580(a)-(f) of the space 500 at noon. As shown in FIG. 5, for example, the plot reflects that at noon there are two client devices 510 with estimated locations in region A, 4 client devices 510 with estimated locations in region B, zero client devices 510 with estimated locations in region C, one client device 510 with an estimated location in each of regions D and E, and two client devices 510 with estimated locations in region F. As described with respect to FIG. 4, the graphics shown in FIG. 5 may reflect the presence of client devices within regions of a space at a particular time, e.g., at noon, or within a particular range of time, e.g., 11:00 AM to noon.

Additionally, the location engine 130 may be capable of tracking the presence of client devices 510 within the regions 580(a)-(f) of the space 500 over time, such that the number of client devices 510 within each region 580(a)-(f) may be tracked over time. For example, FIG. 5 shows the populations in each of the regions 580(a)-(f) for the times 11:00 AM, noon, and 1:00 PM. While described herein as being performed by the location engine 130, in other implementations, other components of the proximity detection system (e.g., the client devices 510) may be capable of tracking and analyzing the estimated locations of one or more client devices 510 within the space 500 or regions of the space 500.

Figure 6:
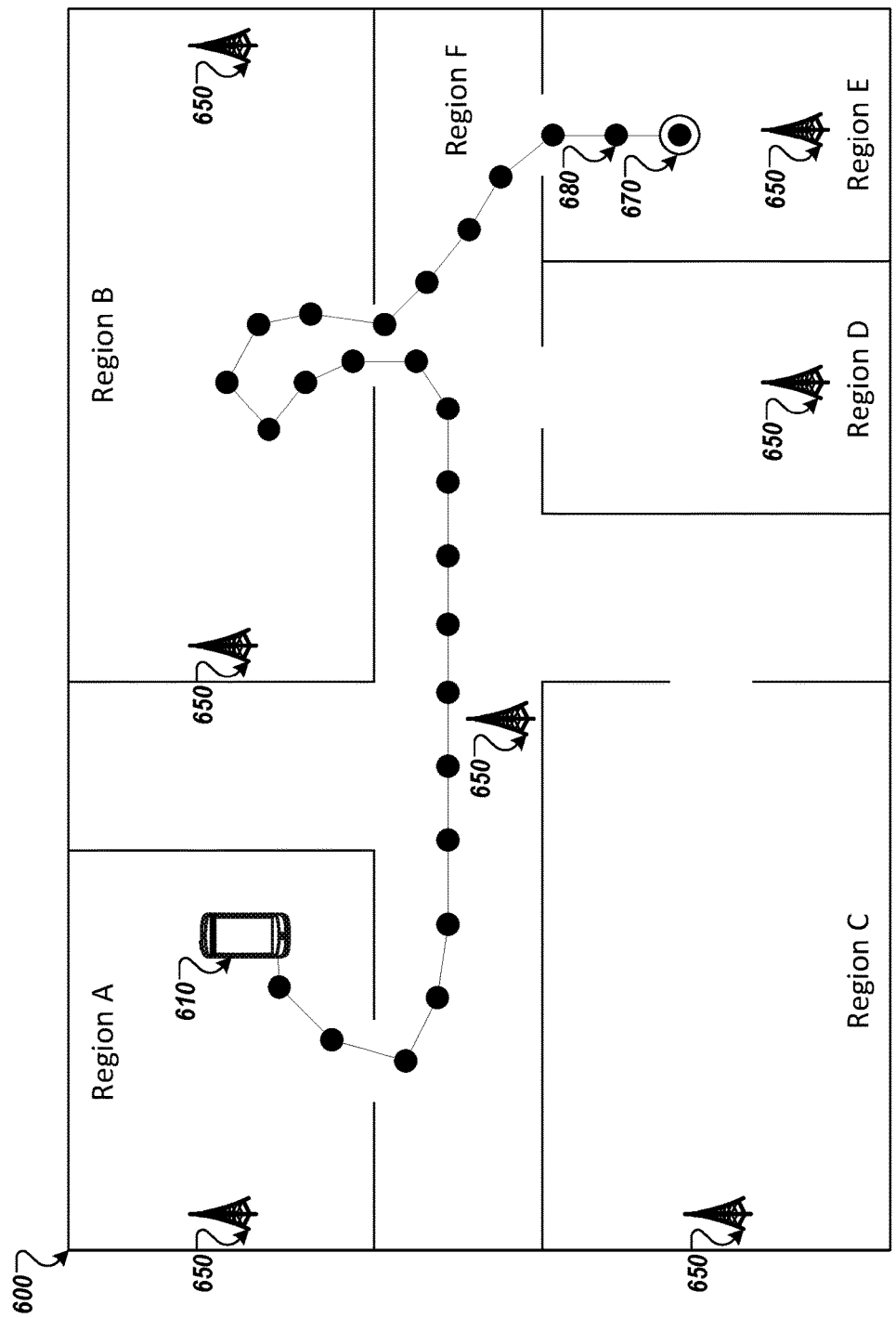

FIG. 6 illustrates an implementation of the proximity detection system that enables the tracking of a particular client device within a space over time. For example, the location of a client device 610 can be estimated at various time points, and a path of the client device 610 can be determined based on the locations of the client device 610 at the various time points.

Specifically, the proximity detection system can identify an initial estimated location of a client device 610, indicated by the point 670 of FIG. 6. This point can correspond, for example, to a time when the client device 610 first detected the presence of one or more wireless sensor beacons 650 and entered ranging mode to determine an estimated location of the client device 610. The proximity detection system can then identify subsequent estimated locations of the client device 610 that are each associated with a particular time. The estimated locations of the client device 610 can be mapped based on the estimated locations of the client device 610 at each time, or a subset of the times. In some implementations, a direction (e.g., a compass heading) and/or a rate of movement of the client device 610 can be determined based on the estimated locations of the client device 610 at each time. The aggregation of the estimated location data pertaining to the client device 610 and/or the plotting of the movement of the client device 610 as shown in FIG. 6 may be performed by the location engine 130 or by another component of the proximity detection system, for example, by the client device 610. Information used to generate the plot of the movement of the client device 610 may further be combined with information used to plot the movement of other client devices, to generate a mapping showing the movement of different client devices through the space 600 over time.

Additionally, in some implementations, the proximity detection system can maintain a mapping of the space 600, for example, a floor plan of the space 600 that identifies multiple regions A through F. In such implementations, tracking the movement of a client device 610 may involve confining the movements of the client device 610 to acceptable paths. For example, the proximity detection system 610 may prohibit a path of the client device 610 that travels through walls of the space 600 (e.g., where the proximity detection system has a map of the space 600 that defines the locations of walls in the space 600). If a detected path of the client device 610 does not match an acceptable path through the space 600, the proximity detection system may "snap" the path of the client device 610 to an acceptable path. Additionally or alternatively, the proximity detection system may maintain a history of paths of client devices through the space 600, and may determine the acceptable or expected paths of a client device 610 through the space 600 based on the history of paths taken by other client devices through the space 600.

Figure 7:
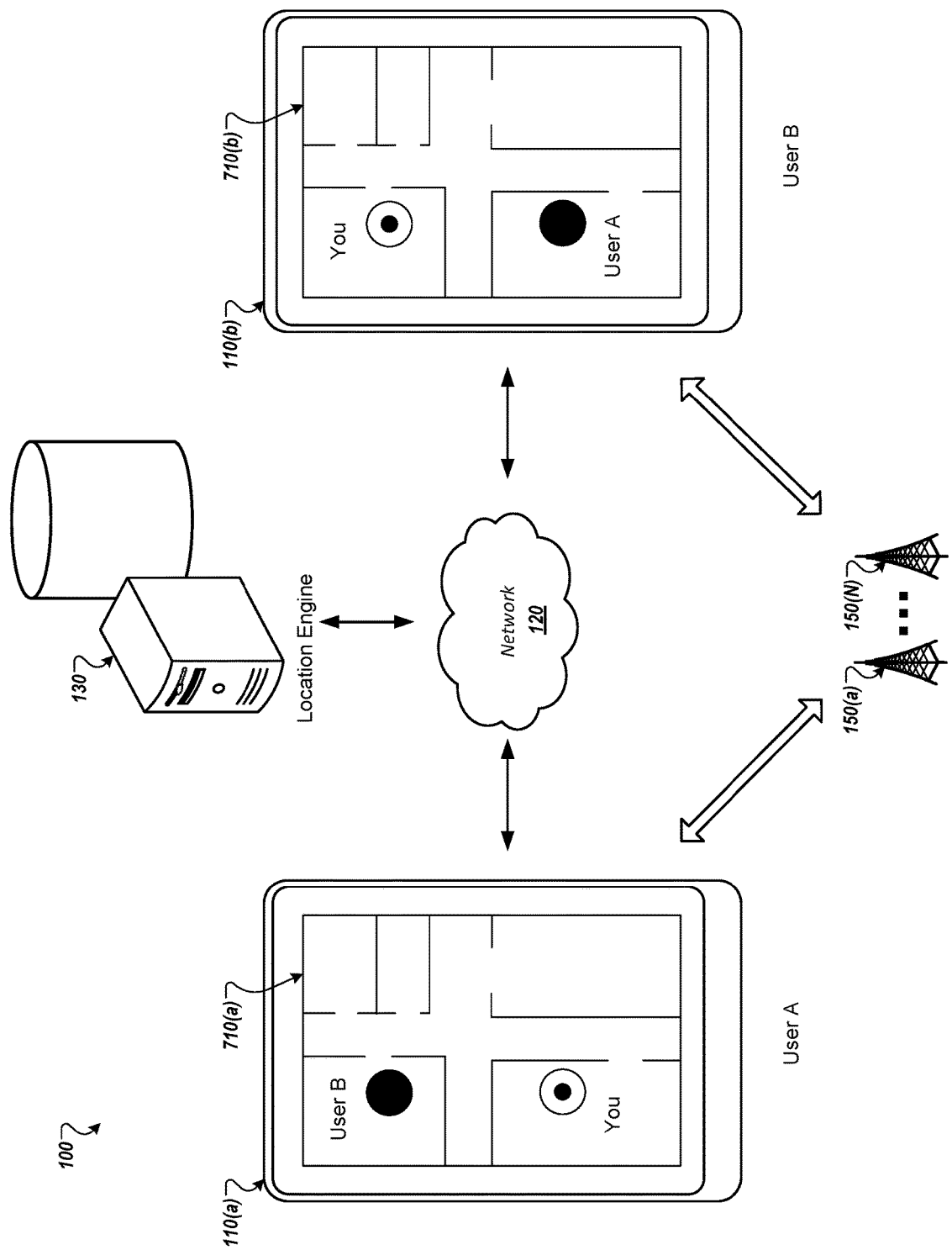
FIG. 7 depicts a system for interactions between multiple client devices based on proximity detection technology.

As described, in implementations in which two or more client devices are located within the same space or region, or are otherwise in communication with the proximity detection system (e.g., in communication with the location server 130), information relating to one client device or a user of the client device may be provided to another client device. FIG. 7 shows an example of such an application.

For example, information may be provided to a client device 110(a) associated with user A that relates to another client device 110(b) associated with a user B, or that relates to the user B. Information associated with a particular client device that is provided to other client devices can include information specifying the estimated location of the particular client device and/or a history of estimated locations of the particular client device. The information may further include information identifying the particular client device. For example, the information may include an identifier used specifically by the proximity detection system to uniquely, and, in some implementations, anonymously, identify any of the particular client device 110(*a*)-110(*b*), an instance of an application hosted on the particular client device 110(*a*)-(*b*), a user associated with the particular client device 110(*a*)-(*b*), a user profile associated with the particular client device 110(*a*)-(*b*), etc. Other information associated with a client device, a user of the client device, or a user profile associated with the client device, may be provided to other client devices. For example, information identifying a specific characteristic of other users may be provided to the other client device. Such characteristics may include, for example, an age of a user, a gender of a user, an expertise of the user, a user's contact information or information identifying a profile (e.g., a social network profile) of the user, information associated with the profile of the user (e.g., the user's calendar, affiliations, etc.), or other information.

The communication of information between the client devices 110(*a*)-(*b*) of FIG. 7 can be achieved via the network 120 and the location engine 130. For example, the client devices 110(*a*)-(*b*) can each be in communication with the location engine 130 over the network 120. Each client device 110(*a*)-(*b*), upon detecting and identifying the wireless sensor beacons 150(*a*)-(N), can notify the location engine 130 of its detection of the wireless sensor beacons 150(*a*)-(N), and/or may report an estimated location of the client device 110(*a*)-(*b*) to the location engine 130. The location engine 130 can determine that the client devices 110(*a*)-(*b*) are in the same space, for example, by determining that the client devices 110(*a*)-(*b*) are in a similar location or have identified wireless sensor beacons 150(*a*)-(N) having the same UUID or major identifier. Based on this determination, the location engine 130 can identify relevant information to provide to each of the client devices 110(*a*)-(*b*). Such information may include information relating to other client devices 110(*a*)-(*b*) and/or may include other information, such as particular content or information determined to be relevant to the estimated locations of the one or more client devices 110(*a*)-(*b*).

Figure 8:
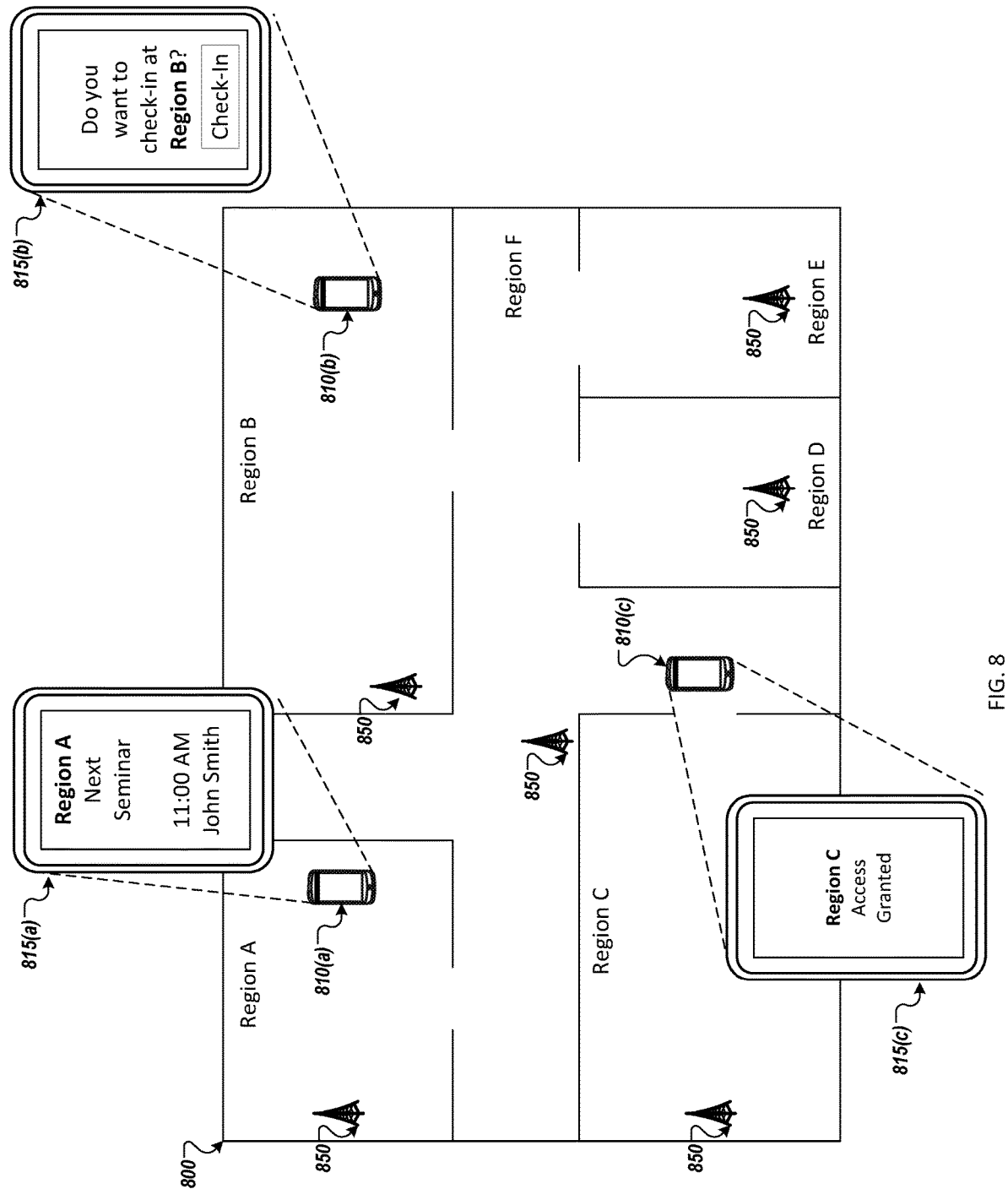
FIGS. 8-9 depict example systems for providing location-based information or services using proximity detection technology.

FIG. 8 illustrates an example system for providing location-based services and information to users of client devices via a proximity detection system. For example, a space 800 may be associated with a proximity detection system that includes one or more wireless sensor beacons 850. Users that are associated with client devices 810(*a*)-810(*c*) may be provided with location-based services or information based on the proximity detection system determining that a client device 810(*a*)-810(*c*) is located in a particular location or region of the space 800. Providing location-based services or information may include, for example, providing a client device 810(*a*)-810(*c*) with specific information, documents, or notifications based on determining that the client device 810(*a*)-810(*c*) is located in a particular location or region of the space 800, may include providing a user of the client device 810(*a*)-810(*c*) with the ability to perform certain actions, including custom actions that are unique to the space 800 or the proximity detection system, or may include providing a user of the client device 810(*a*)-810(*c*) with access to secured locations or regions of the space 800.

For example, the proximity detection system may determine that a client device 810(*a*) is located in a particular region A of the space 800. The proximity detection system may determine that the client device 810(*a*) is located in region A of the space 800 based on, for example, determining that the client device 810(*a*) is proximate to a wireless sensor beacon 850 located in region A of the space 800. Based on determining that the client device 810(*a*) being identified as located in region A of the space 800, the proximity detection system can determine specific information, content, or a notification to present at a display or other interface 815(*a*) of the client device 810(*a*). For example, as shown in FIG. 8, a notification may be provided for output at the interface 815(*a*) that indicates that a next seminar being conducted in region A of the space 800 occurs at 11:00 AM and is being presented by "John Smith." Such information may be presented automatically at the interface 815(*a*), or may be presented in response to a user interaction with the client device 810(*a*), for example, based on a user providing input to the client device 810(*a*) that requests information related to upcoming seminars that are near the location of the client device 810(*a*).

Similarly, the proximity detection system may determine that the client device 810(*b*) is located in or near region B of the space 800. For example, the proximity detection system may determine that the client device 810(*b*) is most proximate to a wireless sensor beacon 850 that is located in region B of the space 800, and may therefore determine that the client device 810(*b*) is likely located in region B of the space 800. Alternatively, the proximity detection system may estimate a physical location of the client device 810(*b*) by performing a trilateration or multilateration process that is based on the proximity of the client device 810(*b*) to each of multiple wireless sensor beacons 850 that are each associated with physical locations within the space 800. Based on determining that the client device 810(*b*) is likely located in the region B of the space 800, the proximity detection system may determine to provide a user of the client device 810(*b*) to perform a custom action. As shown in FIG. 8, for instance, the user of the client device 810(*b*) may be presented with an option at an interface 815(*b*) of the client device 810(*b*) to "check-in" to the region B of the space 800. The interface 815(*b*) may include information providing the user with the option to "check-in" to the region B, along with a control that the user may select to perform the selected action. While the "check-in" action shown in FIG. 8 is one example of an action that the user may perform, the user may be prompted to perform other actions or interactions with the proximity detection system or other systems based on the proximity detection system determining that the client device 810(*b*) is located in the space 800. For example, the user may be able to sign up for an email list relating to an event taking place in region B of the space 800, may be able to provide their contact information to other individuals located in region B of the space 800, or may be capable of performing many other actions.

In another example, the proximity detection system can determine that the client device 810(*c*) of FIG. 8 is located near region C of the space 800, where region C of the space 800 may be a secured (e.g., locked) region of the space 800. The proximity detection system, based on determining that the client device 810(*c*) is located near region C of the space 800 may determine that a user associated with the client device 810(*c*) is permitted to access region C of the property 800. For example, an account associated with the client device 810(*c*) or the user associated with the client device 810(*c*) may indicate that the user of the client device 810(*c*) has a credential or other permission that enables the user associated with the client device 810(*c*) to access the secured region C of the space 800. Based on determining that the client device 810(*c*) is permitted to access the secured region C of the space 800, the proximity detection system may present information at an interface 815(*c*) of the client device 810(*c*) that indicates that the user associated with the client device 810(*c*) may access the secured region C. In some implementations, the proximity detection system may also perform other operations that enable the user associated with the client device 810(c) to access the secured region C of the space 800, for example, by unlocking an entrance to the secured region C. Similarly, additional or different content may be provided at the interface 815(c) that informs and/or enables the user associated with the client device 810(c) to access the secured region C of the space 800. For instance, the proximity detection system may determine a physical representation of a credential, key, or other information that enables the user associated with the client device 810(c) to access the secured region C. As an example, an entrance to the secured region C may include a keyless entry system that requires a user to scan a quick response (QR) code, barcode, or other code that unlocks the entrance to the secured region C. In response to determining that the client device 810(c) is proximate to the entrance of the secured region C and that the user associated with the client device 810(c) is permitted to access the secured region C, the proximity detection system may cause a QR code to be displayed at the interface 815(c) that can be used to unlock the entrance to the secured region C.

While several examples of actions or information that may be presented to a user of a client device 810(a)-810(c) have been presented, other information or actions may also be triggered based on the proximity detection system determining that a client device 810(a)-810(c) is located in a particular region of the space 800, is proximate to a particular wireless sensor beacon 850 associated with the space 850, or has a certain physical location within the space 800. For example, based on a client device 810(a)-810(c) being identified as being in a certain region or physical location of the space 800, or proximate to a certain wireless sensor beacon 850, a document may be transmitted to the client device 810(a)-810(c) for display at an interface 815(a)-815(c) of the client device 810(a)-810(c). In some instances, such a document may only be accessible when the client device 810(a)-810(c) is determined to be located in the certain region or physical location of the space 800, or proximate to certain wireless sensor beacon 850. For instance, a user associated with a client device 810(a)-810(c) may only be permitted to access a certain sensitive document when the location of their client device 810(a)-810(c) is determined to be in a particular region of the space 800 that corresponds to the user's office. In some instances, a user associated with a client device 810(a)-810(c) may be provided with information indicating that they may or may not access such a document, or other content, based on the proximity detection system determining their location or proximity to certain wireless sensor beacons 850. For instance, if a document may only be accessed by a user associated with the client device 810(a) while they are located in region A of the space 800, the user may be presented at the interface 815(a) with information when they enter region A that indicates that they now have access to the particular document or content. If the user attempts to access the document or content when they are not located in region A of the space 800, they may be presented with a notification indicating that they are not permitted to access the document or content at that time, but that they would be permitted to access the content or document if they were to move to region A of the space 800. If the user has already accessed the document or content while located in region A, the user may also be presented with a notification at the interface 815(a) if they are nearing the edge of the region A, for example, a notification that says "access to this document will be suspended if you leave this office."

In some examples, the action taken by a client device 810(a)-810(c) may be dependent upon the proximity detection system determining an action that a user of the client device 810(a)-810(c) is most likely to want or try to perform. For example, while a user of the client device 810(a) may be capable of performing a number of actions while located in region A of the space 800, such as access a document, determine a seminar that is occurring next in region A of the space 800, or "check-in" to region A of the space 800, the proximity detection system may determine that the user is most likely to request what seminar is occurring next in region A, and may therefore determine to provide that information for display at the interface 815(a) of the client device 810(a), in lieu of, for example, presenting a certain document to the user at the interface 815(a).

In some examples, determining the action may involve evaluating one or more candidate actions to determine which action a user is most likely to want or try to perform while in the particular region or physical location of the space 800, or while they are proximate to a specific wireless sensor beacon 850. For instance, each of multiple candidate actions may be associated with a relevance score that indicates the perceived relevance of particular actions to the particular region or physical location within the space 800, or the perceived relevance of particular actions when a client device 810(a)-810(c) is proximate to a particular wireless sensor beacon 850. The relevance score may further indicate, for example, an estimated confidence of certain actions being relevant to the particular region, physical location, or wireless sensor beacon 850. In some instances, a relevance score may be based at least in part on history data that indicates actions that users of client devices 810(a)-810(c) have performed while in the particular region, physical location, or near the wireless beacon 850, such that the relevance score is influenced by past user behavior. The proximity detection system may determine an action to perform by selecting a particular action from among the candidate actions based at least in part on the relevance score of each of the candidate actions, or based on other information.

As an example, if history data indicates that a user associated with a client device 810(a)-810(c) is more likely to use their client device 810(a)-810(c) to log in to a computer system when they are located in a certain region of the space 800 as opposed to accessing a document or desiring to "check-in" to the region of the space 800, the relevance score for an action to log in to the computer system may be greater than the relevance scores associated with accessing a document or performing a "check-in" at the region of the space 800. Based at least on the relevance scores for these candidate actions, the proximity detection system may determine to log the user associated with the client device 810(a)-810(c) into the computer system, and not to access a document or perform a "check-in" at the region of the space 800.

In some examples, the proximity detection system may determine that two or more client devices 810(a)-810(c) that are associated with a single user must be present in certain locations or regions of the space 800, or proximate to certain wireless sensor beacons 850, to enable an action. For example, a user may be associated with both a smartphone device and a smartwatch device that are each in communication with the proximity detection system. Certain actions may require that the smartphone device and smartwatch device are located in specific regions or locations of the space 800, or proximate to a certain wireless sensor beacon 850 to allow the actions to be performed. Alternatively, certain actions may require that the smartphone device and smartwatch device be in the same region or location of the space 800, or proximate to the same wireless sensor beacon 850, for the actions to be performed. For example, for the user to access a certain document using their smartphone device, the proximity detection system may require that both the smartphone and smartwatch devices associated with the user are located in region A of the space 800. The proximity detection system may determine whether both the smartphone and smartwatch devices are located within the region A of the space 800, and if both devices are not determined to be located in the region A of the space 800, access to the document may be prohibited. In a similar example, accessing the document using the smartphone may require that the smartphone and smartwatch are located in the same region or physical region of the space 800, or are proximate to the same wireless sensor beacon 850. Upon the user requesting to access the document using the smartphone, the proximity detection system may determine the regions or physical locations where each of the smartphone and smartwatch are located, or may determine the wireless sensor beacon 850 nearest to each of the smartphone and smartwatch. Access to the document using the smartphone may be permitted if the proximity detection system determines that the two devices are located in the same region of the space 800, if the physical locations of the smartphone and smartwatch are within a threshold proximate distance of one another, or if the smartphone and smartwatch are nearest to the same wireless sensor beacon 850.

Figure 9:
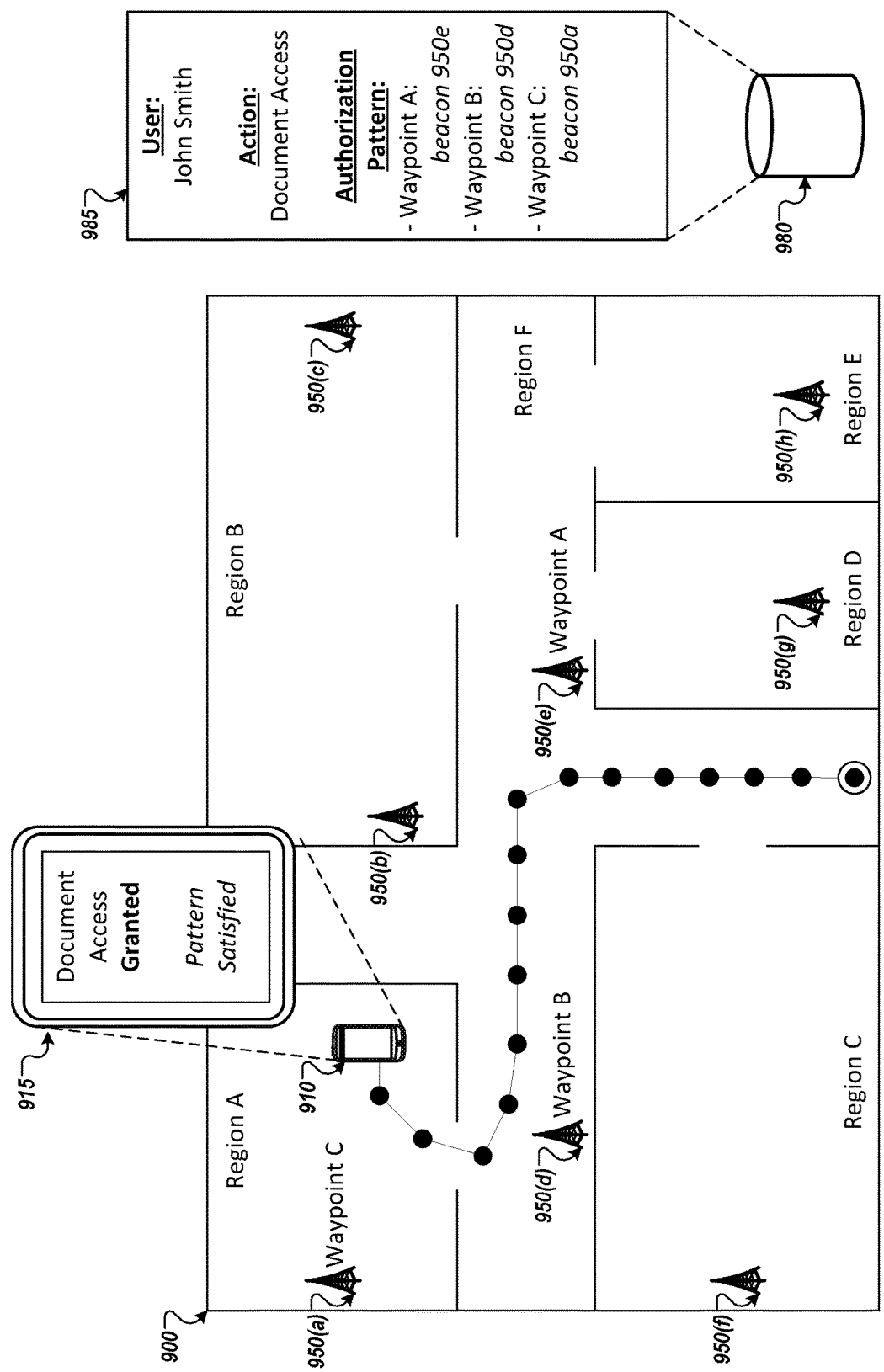

FIG. 9 illustrates another example system for providing location-based services and content to a user associated with a client device 910. In some implementations, as shown in FIG. 9, for a user associated with a client device 910 to perform a certain action, the proximity detection system must first determine that a path of movement of the client device 910 satisfies a pattern of movement that is associated with performing the action.

For example, the proximity detection system may include a database 980 that stores one or more patterns 985 that are each associated with a particular user, client device, and/or action. For example, the pattern 985 shown in FIG. 9 may be specific to the user "John Smith" associated with the client device 910. The pattern 985 may require the client device to follow a path that includes waypoints before the "John Smith" is permitted to perform the action of accessing a document using the client device 910. Specifically, as shown in FIG. 9, the pattern 985 may require that the client device 910 pass each of waypoint A, corresponding to wireless sensor beacon 950(e), waypoint B, corresponding to wireless sensor beacon 950(d), and waypoint C, corresponding to wireless sensor beacon 950(a) before the user is permitted to access a document using the client device 910. In some implementations, for the pattern 985 to be satisfied, the proximity detection system may require that the path of movement of the client device 910 satisfies each of the waypoints in order (i.e., that the path of movement proceed from waypoint A to waypoint B and then to waypoint C), or may not require that the path of movement of the client device 910 satisfy each of the waypoints in a particular order, but only that each waypoint must be satisfied. In some examples, satisfying a waypoint may involve determining that a location of the client device 910 is within a certain region of the space 900, that a physical location of the client device 910 determined by the proximity detection system is within a threshold distance of a particular wireless sensor beacon 950(a)-950(h), or that the client device 910 is within a threshold proximity of a wireless sensor beacon 950(a)-950(h).

Following the example shown in FIG. 9, the user "John Smith" may enter the space 900 and the proximity detection system may begin tracking a path of movement of the client device 910 associated with the user. Tracking the path of movement of the client device 910 may be performed, for example, using the methods discussed with respect to FIG. 6. Upon entering the space 900, the client device 910 may be detected as passing near the wireless sensor beacon 950(e) corresponding to the waypoint A. For example, the waypoint A may be located near a lobby or security checkpoint in the space 900 that the user must pass when entering the space 900. The proximity detection system may further determine that the client device 910 has passed the wireless sensor beacon 950(d) corresponding to waypoint B. and then determine that the client device 910 has passed the wireless sensor beacon 950(a) corresponding to waypoint C. Based on determining that the path of movement of the client device 910 has satisfied each of the waypoints provided for in the pattern 985, the proximity detection system may determine that the user "John Smith" is permitted to perform the action of accessing a document using the client device 910. In response to the determination, the proximity detection system may optionally provide a notification at an interface 915 of the client device 910 indicating that the pattern 985 has been satisfied. For example, the notification "Document Access Granted" may be presented at the interface 915 in response to determining that the path of movement of the client device 910 has satisfied the pattern 985.

In some implementations, the pattern 985 may be predetermined and stored in the database 980 of the proximity detection system. For example, the pattern 985 may be specified by one or more administrators associated with the proximity detection system. Additionally or alternatively, the pattern 985 may be determined based on tracking the movement of the client device 910 over time. For example, based on determining that the client device 910 typically passes by each of the waypoints A, B, and C before the user "John Smith" attempts to access a document using the client device 910, the proximity detection system may establish as the pattern 985 the waypoints A, B, and C as shown in FIG. 9. In some examples, a pattern 985 may be updated or evolve over time, for example, based on determining that more waypoints are needed to ensure that the path of the client device 910 satisfied the path that is intended to be required of the client device 910 before the client device 910 is granted permission to perform the action. In another example, if the proximity detection system determines that, over time, a user associated with the client device 910 follows a different path before attempting to perform the action, the proximity detection system may update the pattern 985 to match the new path.

In some instances, requiring that a path of movement of the client device 910 must satisfy a pattern 985 before permission to perform a particular action is granted allows for additional security, as attempts to perform the action where the client device 910 has not satisfied the pattern 985 may indicate a fraudulent attempt to perform the action, an error with the proximity detection system or the client device 910, or other events or anomalies, such as a user working in a different area than they typically work in an office building. Such event or anomaly detection may also be used outside of the context of gaining permission to perform certain actions. For example, the proximity detection system may monitor paths of movement of one or more client devices and may be able to detect anomalous events, such as emergencies, based on the path of movement of the one or more client devices. For example, based on determining that a number of client devices follow a path toward an exit of a building at the same time, where such movement is not typical, the proximity detection system may determine that a possible emergency (e.g., a fire) has occurred in the building, and may react to the determination (e.g., by notifying the authorities, sounding a fire alarm, etc.).

Figure 10:
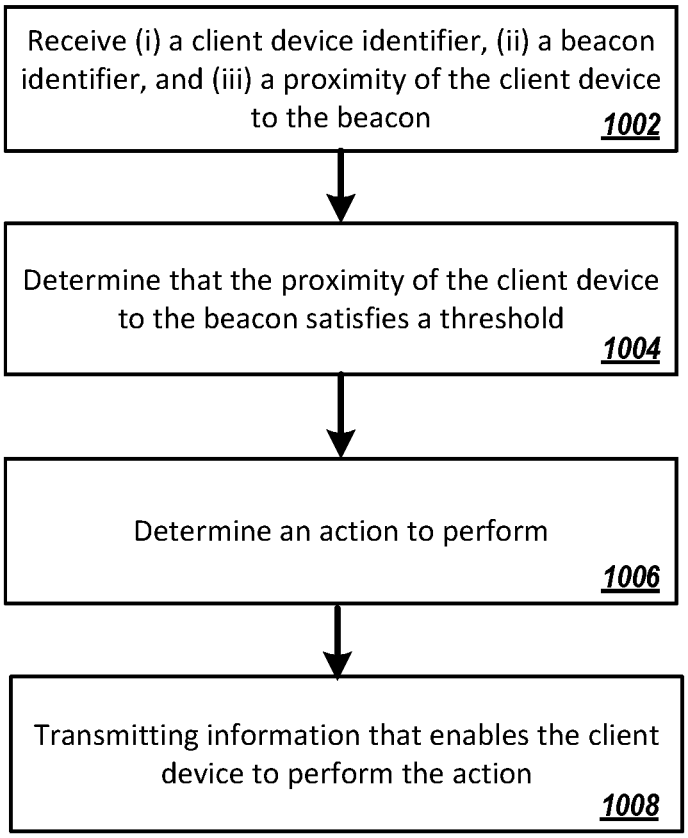
FIG. 10 depicts an example process related to providing location-based information or services using proximity detection technology.

FIG. 10 illustrates an example process 1000 for providing location-based services and information to a client device using a proximity detection system. In some examples, the process 1000 may be performed by the proximity detection system 100 of FIG. 1.

Information is received that indicates a client device identifier associated with a client device, a beacon identifier associated with a wireless sensor beacon, and a proximity of the client device to the wireless sensor beacon (1002). For example, the location engine 130 of FIG. 1 may receive information from a client device 110(a)-110(b) that is running an instance of a proximity detection system application that includes an identifier that uniquely identifies a client device 110(a)-110(b), that includes an identifier that uniquely identifies a wireless sensor beacon 150(a)-150(N) in the proximity detection system 100, and that indicates a proximity of the identified client device 110(a)-110(b) to the identified wireless sensor beacon 150(a)-150(N). In some implementations, the information may be received by the location engine 130 over the one or more networks 120. The information indicating the proximity of the client device 110(a)-110(b) to the wireless sensor beacon 150(a)-150(N) may be received from the client device 110(a)-110(b), or alternatively may be computed by the location engine 130, for example, based on receiving information that indicates a strength of a wireless signal emitted by the wireless sensor beacon 150(a)-150(N) detected by the client device 110(a)-110(b).

A determination is made that the proximity of the client device associated with the client device identifier to the wireless sensor beacon associated with the beacon identifier satisfies a threshold proximity (1004). For example, the location engine 130 may receive or determine the proximity of the identified client device 110(a)-110(b) to the identified wireless sensor beacon 150(a)-150(N), and may compare the proximity to a threshold. The proximity threshold may be a predetermined proximity threshold, such as one set by an administrator of the proximity detection system, or may be a proximity threshold that is otherwise determined. For example, the proximity threshold may be determined based on a machine learning process that optimizes the proximity threshold based on tracking performance of the proximity detection system 100 for various proximity thresholds. The location engine 130 may determine that the proximity of the client device 110(a)-110(b) to the wireless sensor beacon 150(a)-150(N) satisfies the proximity based on, for example, determining that the proximity is less than the proximity threshold, thereby indicating that the client device 110(a)-110(b) is within a threshold proximity of the identified wireless sensor beacon 150(a)-150(N).

Based on determining that the proximity of the client device associated with the client device identifier to the wireless sensor beacon associated with the beacon identifier satisfies the threshold, an action to be performed is determined (1006). For example, based on the location engine 130 determining that the client device 110(a)-110(b) associated with the client device identifier is within the threshold proximity of the identified wireless sensor beacon 150(a)-150(N), the location engine 130 can determine an action for the identified client device 110(a)-110(b) to perform. For example, the determined action may be an action to present or provide access to a document or other content, to provide a notification, to grant access to a particular region, location, or other area of a property or other space, to perform a custom action, to request information from a user, or to perform another action. In some examples, determining the action to perform may involve determining an action that the client device 110(a)-110(b) is otherwise permitted to perform, for example, based on a path of movement of the client device 110(a)-110(b) satisfying a specific movement pattern as discussed with respect to FIG. 9. In some examples, the determined action may be determined based on the wireless sensor beacon 150(a)-150(N) that the client device 110(a)-110(b) is determined as being proximate to. For example, the location engine 130 may determine one action based on the client device 110(a)-110(b) being proximate to a particular wireless sensor beacon 150(a)-150(N), and may determine another action based on the client device 110(a)-110(b) being proximate to another wireless sensor beacon 150(a)-150(N).

Information is transmitted to the client device associated with the received client device identifier that enables the client device to perform the action (1008). For example, the location engine 130 may provide information to the identified client device 110(a)-110(b) that causes or enables the identified client device 110(a)-110(b) to perform the determined operation. In some instances, the information may be provided over the one or more networks 120 of the proximity detection system 100. The identified client device 110(a)-110(b) may receive the information enabling performance of the determined action, and in response may perform the action.

The described methods can be implemented in any number of different settings where it would be useful to have capabilities to track the location of one or more client devices, and to access and share additional information among the client devices that relates to users of the client devices or to the client devices themselves.

For example, such settings may include venues used to hold networking, tradeshow, or other social or business events. In such a setting, client devices may be grouped into different groups depending upon the users associated with the client devices. For example, attendees of a networking event may be associated with one group of client devices that each host an instance of an attendee-specific application. Staff of the networking event, on the other hand, may be associated with a different group of client devices that each host an instance of a staff-specific application. Different information and functionalities may be made accessible to the different groups of users associated with the different client device groupings.

As an example, an attendee of the networking event having a client device hosting an attendee-specific application can estimate the location of the attendee's client device using proximity detection technology in order to provide the attendee with navigation services. Navigation services may include providing to the attendee a map of the networking event's venue, an estimated location of the attendee's client device, the locations of other important places within the venue (e.g., first aid, restrooms, check-in, etc.), or may provide information indicating events occurring in particular locations of the venue (e.g., that a keynote speech takes place in a particular room at a certain time). In some implementations, navigation services can provide directions and/or a map for the attendee to use in navigating from their current estimated location to a particular destination. Furthermore, information provided to an attendee can be based on the estimated location of the attendee. For example, based on the attendee being located at a particular location within the venue, information can be provided to the user indicating upcoming events near the user, offering the attendee information and/or a profile associated with other attendees near the user, may provide information indicating the location of members of the networking event staff within the venue, etc. In some instances, information provided to an attendee's client device can include a summary of the content being presented at a particular booth or area that the attendee is near (e.g., where determining that the user is near the particular booth or area is accomplished by placing a wireless sensor beacon at the particular booth or area and determining that the attendee is closest to that particular wireless sensor beacon). In some implementations, the attendee may be provided with notifications, such as popup notifications, based on the estimated location of the attendee's client device. For example, based on an attendee being at a location proximate to an upcoming keynote speech, the attendee can be provided with a popup notification that provides the attendee with information about the speech, the location of the speech, the time of the speech, the speaker, etc. In some instances, the attendee may be able to interact with the application on their client device to provide certain requests, for example, to request help in the case of an emergency, to request information for a particular event, to request information associated with a particular attendee of an event, etc. Such capabilities may enable the staff of an event to better aid the attendee, for example, by being able to locate the attendee after the attendee has requested help through the application. These capabilities may also enhance the attendee experience, for example, by allowing attendees to find one-another or to exchange contact information when they meet. In some implementations, an attendee-specific application hosted by a client device may enable an attendee to take notes or provide feedback with respect to one or more events (e.g., keynote speeches), facilities of the venue, event staff, other attendees or speakers, etc.

Additionally, in some implementations, a proximity detection system associated with a venue may track the attendance history and/or locations where an attendee has been. For example, a log may be maintained (e.g., at the attendee's client device or at the location engine 130) that identifies when the attendee entered and exited the venue over multiple days, where the attendee was located at different times over multiple days, etc. Other information can also be logged in association with the attendee's behavior, for example, how far the attendee had to walk to arrive at different areas of interest, information indicating which talks or other events the attendee visited during an event, etc. Additionally, in some implementations, the proximity detection system may provide location-based services that are able to grant event attendees access to particular areas of a venue, such as access to the event venue as a whole, access to particular booths or areas of the venue, access to food courts or restrooms, etc. By enabling an attendee to access such areas based on their proximity to those areas, the need for credential badges (e.g., an identification card or barcode) can be eliminated or reduced.

Staff of a tradeshow, networking, or other social or business event may also have client devices that are each associated with an instance of a staff-specific application. The staff-specific application can provide different functionalities than the attendee-specific application, which may aid the staff in performing their duties at the event, or that may facilitate the jobs of staff members.

For example, the proximity detection system may provide location-based services that are able to grant staff members access to particular areas of a venue, such as particular booths, backstage areas, food preparation areas, control rooms, facilities, etc. By enabling a staff member to access such areas based on their proximity to those areas, the need for credential badges (e.g., an identification card or barcode) can be eliminated or reduced. Additionally, the staff may be able to view at their client devices the locations of other staff members or of other attendees. This may aid the staff by, for example, determining areas where large numbers of attendees are present, where other staff members are located if additional help is required, etc.

The staff-specific application may further enable various analytics to be performed relating to the attendance of an event and/or the displacement of attendees or staff within the event venue. For example, the proximity detection system can track the numbers of attendees at the event, where the attendees are concentrated within the venue at different times, the movement of staff members within the venue over time, the duration of time that attendees are located in different regions of the venue (e.g., at a particular booth, conference room, speech, etc.), areas of congestion at the venue (e.g., at a particular restroom or dining area), etc. Such analytics may provide insight relating to the event, for example, by signaling events or areas that are particularly popular or unpopular, by indicating whether the staffing of the event was appropriate, etc.

Additionally, the proximity detection system can enable analytics to be performed that consider various groups of attendees and/or other people at an event. For example, an application can enable analytics to be performed that track the attendance, movement, etc., of attendees that correspond to various groupings. Such groupings may be based on age, gender, expertise, interest, country or region of origin, company, etc. Thus, much of the same information that has been described as being available for the whole body of attendees may also be available for one or more of the groupings of individuals. Groupings based on multiple factors may also be possible, for example, attendees of a conference that are between the ages of 25-35 years old and that are electrical engineers. Such analysis may provide additional post-event information to event staff, event organizers, etc., that would be useful in the planning of similar events in the future. In some instances, the proximity detection system and/or the event staff may be able to selectively provide information to one or more attendees or groups of attendees. For example, a notification may be pushed to the client devices of all electrical engineers at a trade show that provides information about a particular booth at the trade show that electrical engineers may find interesting.

Similar capabilities described with respect to a proximity detection system of a trade shown, network, or other social or business event may also be applicable to other types of events or venues, such as sporting events occurring at a stadium, arena, or other venue, or concerts or other performances occurring at a particular concert hall, theatre, cinema, or similar venue. Again, multiple versions of applications associated with the proximity detection system may be used based on a grouping of different users of the applications. For example, there may be an application that is specific to event-goers, where the event-goer application may be hosted by the client devices of one or more attendees of a sporting event, concert, live performance, movie, etc.

Another application may be specific to the administrative personnel and/or staff associated with the venue of the event or of the event itself, for example, a stadium manager or a security staff member. Functionalities of the proximity detection system offered to a particular client device may vary based on whether the particular client device is associated with an instance of an event-goer application or an administrative application.

For example, using the methods described previously, an event-goer may be provided with information on where to park, where handicapped or valet parking is located, etc., based on the proximity detection system determining that the event-goer's client device is within range of one or more wireless sensor beacons associated with the event venue. In some implementations, the event-goer application may have access to information associated with the event-goer, such as the event-goer's type of parking permit, their seating assignment, etc., and may be able to provide information to the event-goer that is specific to their needs and/or their location. For example, an event-goer that has a parking permit for a specific parking lot may be provided with directions that enable the event-goer to navigate from their current location to the specific parking lot. Similarly, once the event-goer has parked and is located in their designated parking lot, the proximity detection system may be able to determine where the event-goer can purchase tickets, for example, by providing the event-goer with directions to a nearby ticket booth, or may be able to determine an assigned seat of the event-goer for the event and provide the event-goer with information navigating the event-goer to their seat. Additional services may be provided once the event-goer is inside of the event venue, for example, by providing the event-goer with information indicating concessions, restrooms, first aid facilities, etc., that are near the event-goer's current location, that are near the event-goer's assigned seat, etc.

Additionally, in some implementations, the proximity detection system can aggregate information for multiple event-goers, such as the current locations of multiple event-goers, and can provide relevant information to a particular event-goer. For example, the proximity detection system can determine the number of event-goers near a particular restroom or concessions, and can estimate the wait time at each of these locations, the number of event-goers that are likely in line at each of these locations, etc. Additionally, an event-goer may be provided with recommendations based on this location information, for example, information suggesting that the user use a particular restroom, particular concessions, etc.

Additionally, location-based services provided to event-goers having client devices that are hosting the event-goer application can include location-based advertisements or other information. For example, when an event-goer walks past a particular retail store within a stadium or other venue, the event-goer may be provided with a notification that indicates sales for particular merchandise, hours for the retail store, a website associated with the retail store, etc. In some implementations, event-goers may also be able to determine the locations of other event-goers, such as other event-goers in their group. For instance, event-goers in a group may allow their location to be tracked by other event-goers in the group, such that a particular event-goer may be able to view the locations of the other people in their group. Such an application may be helpful, for example, to find other event-goers in their group if they become separated, to determine whether others in their group have left the venue, to determine where others in their group are seated, etc.

An administrative application associated with a proximity detection system may provide additional or different functionalities from the event-goer application. For example, the administrative application may provide capabilities for performing ticket validation for event-goers. Such validation may be based in part on a location of an event-goer associated with a ticket, for example, to ensure that the user of the ticket for an event is the purchaser of the ticket, based on the ticket purchaser's location being near the location where the ticket is being used to enter the event. In some implementations, the administrative application used for ticket validation may integrate with a barcode reader or other device such that the administrative application can scan or otherwise verify a ticket holder's identity or validate a ticket-holder's ticket.

Additionally, an administrative application may have capabilities for providing an enhanced event-goer experience. For example, an event staff member having a client device that hosts an administrative application may be able to communicate with an event-goer having a client device that hosts an event-goer application. The communication between the event staff member and the event-goer via their respective applications may enable various location-based services to be provided to the event-goer. For example, an event-goer may be able to order concessions via the application, such that one or more event staff members with client devices hosting administrative applications may be able to receive the order, and to deliver the completed order to the event-goer at the location of the event-goer, for example, at their seat. The applications may also be integrated with payment functionalities that enable the event-goer to pay for their concessions using the application. In some instances, payment for a concessions or other order may consider the proximity of the event-goer to a staff member, for example, such that the event-goer only pays for the concessions when a staff member delivering the concessions is near the event-goer. In other implementations, communications between event-goers and event staff or administrators may enable event-goers to request aid from the staff, such that the staff will be able to use the proximity detection system's location services to locate the event-goer requesting aid.

Furthermore, an administrative application can provide information relating to the positions of event-goers and/or staff members throughout an event venue (e.g., throughout a stadium or other venue). For instance, the proximity detection system can determine the locations of event-goers to detect congestion in the movement of the event-goers (e.g., as they enter or exit an event), to detect areas where more staff may be needed (e.g., in areas with high concentrations of event-goes), or to aid in making other decisions, for example, whether to dedicate more staff to operating the ticket booths of a venue or to dedicate more staff to operating the concessions of the venue.

In some implementations, the proximity detection system can enable analytics to be performed on location data, and can provide the results of those analytics to administrators or staff having client devices hosting the administrative application on their client devices. For example, such analytics may track the movement of event-goers through a venue over time, may track when event-goers enter or exit the venue, may track which areas of the venue are the most popular or most crowded, which areas of the venue are the least popular or least crowded, etc. Other analytics may be performed similar to those described with respect to the trade show, networking, or other social or business events setting described previously.

Similar functionalities as described above may also be applied to an office building or other work environment setting. For example, employees of a business may be able to host an employee application on their client devices, while managers or other administrators may be able to host a management application on their client devices. The employee and management applications can provide various information or services to business employees, managers, and other administrators using the proximity detection system.

An employee application may be capable of providing various location-based services offered by a proximity detection system. For example, based on the proximity detection system determining an employee's location (e.g., using the trilateration method discussed with respect to FIG. 1), the proximity detection system may determine to provide the employee with certain information, capabilities, notifications, documents, or other information or services. For example, based on determining that an employee is located within a copy room of an office building, the proximity detection system may determine to provide information to the employee that informs the employee how to operate a copy machine located in the copy room. Similarly, based on determining that the employee is located near a secure area within the office building, such as a conference room, store room, or other secured area within the office building, the proximity detection system may perform operations or enable the employee's client device to perform operations to access the secure area. For example, the proximity detection system may automatically unlock a door to a secure area based on determining that the employee's client device is located near the secure area, may cause a credential that enables the employee to access the secure area at a display of the employee's client device, or may otherwise perform operations or provide information to the employee's client device that enables the employee to access the secured area of the office building.

In other examples, an employee may only be provided with certain capabilities or information based on a particular path of movement of the employee's client device determined by the proximity detection system satisfying a required pattern of movement. For example, an employee may only be able to log in to a computer system in their office if the proximity detection system determines that the employee's path of movement has satisfied a predetermined pattern of movement, e.g., by passing by certain wireless sensor beacons in a certain order before attempting to log in to the computer system. Other location-based services may be provided to the employee by the proximity detection system, for example, by enabling the employee to locate other employees or administrators within the office building using the techniques of FIG. 7.

A management application enable various services to be provided to managers, executives, or other administrators of a business using the proximity detection system. In some instances, these services may be provided in addition to or in lieu of other services that are available, for example, to employees using the employee application associated with the proximity detection system. Similar to the services provided to users having the administrative application available on their client devices as discussed with respect to the event and venue applications above, users of the management application may be provided with analytics regarding employees and the use of the office building space by employees and others having the employee application. For example, executives of a business may be able to access analytical information that indicates when employees, or a particular employee, enter and leave the office building, where employees spend the most time within the office building, may determine how employees move through the office building, or may determine other information related to the presence or movement of employees within various areas of the office building. Such information may be used and/or analyzed to determine efficiency and/or productivity metrics related to the office building or employees of the business, for example, by determining how efficiently employees can travel between various areas of the office building. In some implementations, users having access to the management application may be able to send specific notifications or information to employees associated with client devices running instances of the employee application or other users associated with client devices running instances of the management application, or may be able to configure settings related to information presented to users based on their determined locations within the office building, permissions granted to users based on their determined locations, or other settings associated with providing location-based services.

Similar functionalities as described may also be applied to a museum or zoo setting. For example, guests of a museum or zoo may be able to host a guest application on their client devices, while staff or administrators of the museum or zoo may be able to host an administrative application on their client devices.

A guest application may be capable of providing various location-based services offered by the proximity detection system. For example, based on a guest's location being estimated by the system (e.g., using the trilateration mechanism described), navigation services can be provided to the guest. Such navigation services can include providing a map or directions to the guest that enables the guest to navigate from their estimated location to one or more destinations. The navigation services may also provide information to the guest identifying one or points of interest at the museum or zoo, such as the locations of gift shops, restrooms, featured displays, exits, etc. Additionally, information may be provided at a guest's client device based on an estimated location of the guest. For example, based on determining that a guest is closest to a particular wireless beacon associated with a particular display (e.g., a particular piece of artwork, collection of artwork, or animal exhibit), information relating to the display may be provided to the guest. Other location-based services can include providing guests with notifications, such as popup notifications, when they are in certain areas of a museum or zoo. For instance, a guest walking through a museum may be provided with notifications that include specific information, advertisements, or coupons as the guest nears various displays, gift shops, restaurants, etc., within the museum.

In other examples, the location of a guest may be tracked over time and particular information or content can be provided to the guest based on their location history. For example, based on determining that a guest has spent considerable time in a particular area of a museum or zoo that features certain displays, recommendations can be provided to the guest for other displays that may interest the user. As an example, based on determining that a guest has lingered in the Monet collection of an art museum for one hour, a notification may be presented to the guest indicating that the guest may also want to visit the Cezanne collection of the art museum. In other implementations, a location history for a guest may be used to provide recommendations to the guest when they are in other locations. For example, based on determining that the guest lingered in the Monet section of an art museum for one hour, when the proximity detection system determines that the guest is located in a gift shop of the museum the user may be provided with an advertisement for a Monet print that can be purchased in the gift shop.

Additionally, a guest application may enable the guest to revisit their trip to a museum or zoo at a later time. In such an implementation, the guest may be able to view where in the zoo or museum they visited, which displays they spent the most time at, and which displays they missed but may want to see during their next visit. Additionally, the application may enable users to link other content, such as photos or videos stored on the client device, with their visit to the museum or zoo. For example, based on a guest taking a picture at a particular time, the proximity detection system can associated that picture with the guest's location at the particular time. The proximity detection system can then determine what artwork or animal display the picture likely corresponds to, based on the artwork or animal display being located near the guest's location at the particular time. Such functionality can essentially enable the guest to generate a "scrapbook" for their visit.

An administrative application used in a museum or zoo setting may provide various functionalities to administrators or staff of the museum or zoo. As described with respect to the event venue examples, the administrative application can allow for the ticketing of museum or zoo guests, or can allow for access of a guest, administrator, or staff member to various areas within a museum or zoo based on a credential or permission available to the individual. For instance, a curator of a museum may be able to access most areas of a museum, while staff may be limited to accessing only certain non-public areas (e.g., delivery docks, janitorial closets, control rooms, break rooms, first aid stations, etc.). The curator or staff member may be provided access to a particular area within the museum based on determining that their client device that is hosting the administrative application is near the particular area. In some implementations, providing access to the particular area may be based on a combination of factors, for example, based on the curator of the museum being near the particular area and based on the curator entering an access code at a door that leads to the particular area.

The administrative application may further enable administrators or staff of a museum or zoo to provide notifications to one or more guests at the museum or zoo. For example, an administrative application can be utilized to provide notifications to all of the guests at the museum or zoo of an upcoming display or event at the museum or zoo. In some instances, notifications can target specific groups of guests (e.g., only children under the age of 15, or only guests who have indicated that they are interested in the works of Monet). The administrative and guest applications may be able to communicate for other purposes as well. For example, guests may be able to request aid at a particular location in a zoo, and an administrator using a client device with an administrative application may be notified of the request for aid and be provided with a location of the guest. In some implementations, the individuals using the guest and/or administrative applications may be able to access an interface of their applications to take notes or provide feedback on a particular display or other topic (e.g., to comment on the quality of the facilities at the museum or zoo)

Additionally, as described previously with respect to other settings, the administrative application may allow for the analysis of location data obtained by the proximity detection system. For example, the proximity detection system may be capable of tracking the locations of multiple guests within a museum or zoo over time. The proximity detection system can perform analytics on the location data relating to the locations of the multiple guests to determine, for example, the density of guests in particular areas of the museum or zoo, the movements of people through the museum or zoo, congestion or problem areas within the museum or zoo (e.g., that certain areas are congested at certain times of day), areas or displays at the museum or zoo that may require additional staff, etc. Additional analytics and uses for those analytics are envisioned, for example, by adapting the uses discussed previously to a museum or zoo setting.

In some implementations, an administrative application may be able to provide post-visit communications to guests of a museum or zoo. For example, guests may be provided with discounts for their next visit, may be provided with a record or summary of their visit, may be provided with suggestions for upcoming events, may be provided with requests for donations, may be offered a membership to the museum or zoo, etc.

Other settings may also benefit from the embodiments of the proximity detection technology described herein. For example, the use of a proximity detection system may have applicability to an amusement park or casino in much the same way as it is applicable to a trade show, networking, or other social or business event, an event held at a stadium, concert hall, or other venue, or at a museum or zoo.

In the context of an amusement park, for example, a guest of the amusement park may have a client device that features a visitor application, while an administrator of the amusement park may have a client device that features an administrative application. The visitor application may provide visitors with ticketing functions similar to those described, as well as navigation features such as the ability to find appropriate parking, locate and obtain directions to a particular destination on the amusement park grounds, to define a path for traveling through the amusement park that includes attractions that the visitor wants to see (e.g., a "trip planner"), etc. The visitor application provide location-based services, such as indicating the number of people at certain attractions or facilities (e.g., restrooms) or the wait time for certain attractions or facilities, for example, based on a number of other visitors who are identified as being located near those attractions or facilities. Location-based services can further include providing a visitor with notifications when the visitor is near certain attractions or facilities, such as when the visitor is near a particular roller coaster, near a place where the visitor can have their picture taken, near a restroom or concessions, etc. Such notifications can include, in some implementations, coupons or advertisements for specific attractions or facilities. For example, a visitor can be provided with an advertisement for a new roller coaster when they are walking near the line for the roller coaster, or can be provided with coupons when they are walking near a concessions or restaurant in the amusement park. The visitor application may also accommodate capabilities for visitors to purchase particular items while at the amusement park. For example, when a visitor is determined as leaving a roller coaster, the visitor can be provided with options for ordering photographs of themselves on the roller coaster. As another example, a visitor can be presented with options to purchase gifts when the proximity detection system determines that they are leaving the amusement park.

In some implementations, a visitor application can allow a particular visitor to locate other visitors at the amusement park, such as other visitors in their group. Locating other visitors may be dependent upon, for example, the other visitors providing permission for the particular visitor to track their locations.

Additionally, the attractions of an amusement park may be able to receive information indicating the locations or movement of one or more visitors within the amusement park, and may be able to perform certain operations based on the locations or movements of the one or more visitors. For example, a light parade or other attraction at an amusement park may react to more or fewer visitors being nearby (e.g., by causing the show provided by the light parade to change), may react to the rate at which the visitors are moving, etc.

An administrative application may be hosted by the client devices of amusement park administrators or staff that provides various functionalities to the administrators or staff. The functionalities provided by the administrative application may be unique from those that are provided by the visitor application. For example, the administrative application may be able to determine the locations of visitors within the amusement park. The proximity detection system may be able to provide information indicating the locations of the visitors within the amusement park to an administrator or staff member. For example, the administrative application may be able to notify a staff member when a visitor requests aid, and may be able to provide the staff member with the visitor's location. The proximity detection system may also be able to provide the administrator or staff member with information showing the concentration of visitors and/or staff within the amusement park, may be able to provide information showing the density and/or movement of visitors within the amusement park, etc.

As described with respect to other scenarios, the proximity detection system may be able to provide additional analytics to an administrator or staff member based on the location data obtained by the proximity detection system. Such information may include, for example, a level of popularity for a particular attraction that is based on the number of visitors who visited the attraction, are currently at the attraction, or based on a wait time for the attraction. Analytics may be provided that show visitor behavior, for example, how far visitors are willing to walk for certain attractions, how often visitors tend to stop to use a restroom or purchase concessions, etc. Analytics may be integrated with other data, such as visitor purchase histories, to provide insight into visitor behavior. Such analytics may convey, for example, information indicating where visitors tend to purchase gifts or concessions, whether visitors of certain attractions tend to purchase more or fewer gifts or concessions, which demographics of visitors attend certain attractions or make certain purchases, etc. The administrative application may further allow for post-trip communications to be provided to visitors of the amusement park, such as communications including a trip record for the visitor, recommendations for future trips to the amusement park, coupons or advertisements for future trips to the amusement park, etc. Such information may be provided to the visitor based on information that the visitor provides to the proximity detection system, for example, based on settings or demographic information provided by the visitor in a visitor profile that is associated with the visitor's client device and/or visitor application instance.

Similar functionalities to those described can be applied to a casino setting as well, where visitors to the casino may utilize a gambler application and administrators or staff of the casino may utilize an administrative application. As in other settings, the gambler application and the administrative application may provide different functionalities to casino visitors and casino staff or administrators, respectively.

For example, a gambler application associated with a proximity detection system for a particular casino may provide notifications to potential gamblers when they are near the casino or are near a certain area within the casino. For example, such notifications may provide coupons for "$100 in free chips" to potential gamblers that are walking past the casino. Within the casino, such notifications may include advertisements for upcoming events (e.g., an upcoming poker tournament), or may provide other information to the gambler (e.g., a notification that the user is nearing the slot machines). Other notifications may be provided to gamblers based on their movement or behavior within the casino. For example, a gambler who is detected as leaving the casino may be provided with a coupon for "$100 in free chips" as an incentive for the gambler to stay at the casino, or a gambler who has been standing near a particular table but is not playing may be encouraged to do so with an advertisement, coupon, etc.

In some implementations, the proximity detection system may be able to access other information associated with a gambler, such as the gambler's win history, which tables or games the gambler has played previously, etc. Such information may be accessible to the proximity detection system based on the proximity detection system storing or having access to a gambler profile that is associated with the particular gambler (e.g., a gambler profile that is associated with the instance of the gambler application that is hosted on the gambler's client device). Information may be provided to the gambler based on this information. For example, based on the proximity detection system determining the location of a gambler and determining that the gambler often plays poker, the gambler application may automatically provide the gambler with directions or other navigation services to direct the gambler to the poker tables. In other implementations, the proximity detection system may be able to track information relating to one or more tables within a casino, and to provide such information to gamblers using the gambler application. For instance, the proximity detection system can track whether certain games or tables are "hot" (e.g., such that gamblers are winning frequently) or which games or tables are "cold" (e.g., such that the gamblers are not winning frequently). Gamblers may be able to access such information using the gambler application and may be provided with additional information relating to such information, for example, navigation services directing the gambler to "hot" tables. In some instances, the gambling application may also track the identity or performance of particular gamblers, and may provide a gambler and/or other gamblers with information relating to the identities or performance of the particular gamblers. For example, other gamblers using the gambler application may be able to determine which gamblers have made the most winnings that day, where those gamblers are located or what games they are playing, etc.

An administrative application used in a casino setting may provide various functions, some of which are similar to those previously described with respect to other settings and scenarios. For example, an administrative application may be able to track and report information relating to the locations and movements of gamblers within the casino. Furthermore, the administrative application may provide a staff member or administrator with information indicating which tables or gamblers are "hot" or "cold," such that the staff member or administrator may be able to act on that information. For example, an administrator may decide to change the dealer at a blackjack table that is particularly "hot" to try to slow the earnings of gamblers there, or an administrator may identify particular gamblers who are spending the most money or winning the most money to provide special treatment to those gamblers (e.g., with free drinks or free chips). Additionally, an administrator or staff member may be able to provide information to gamblers using the gambler application, such as information suggesting different games or tables, information advertising various events or promotions at the casino, etc. In some implementations, an administrator using the administrative application may be able to view the locations of various staff members, such as dealers at the casino. Thus, the administrator may be able to track which dealers are working at which tables at the casino, and may also be able to track analytics relating to those dealers or tables, for example, to determine that a particular table happens to become "hot" whenever a particular dealer is working that table. The proximity detection system may further track gambler or staff behavior over time, such as by tracking a gambler's betting history, a gambler's drink and food orders, a security guard's path as they walk through the casino, etc. The behavior information can be provided to administrators or staff members for review, or additional analytics may be performed on the behavior information. Other uses and capabilities of the gambler and/or administrative applications are envisioned, such as by adapting the uses and capabilities described with respect to the various other settings to a casino setting.

Additionally, transportation hubs such as airports, train stations, bus terminals, etc., or transportation vehicles such as planes, trains, buses, etc., may utilize a proximity detection system to provide various services to travelers and/or administrators and staff members. Similar to the above scenarios, travelers may be associated with client devices hosting instances of a traveler application, while administrators or staff members may be associated with client devices hosting instances of an administrative application.

A traveler application may provide capabilities that allow travelers to locate, for example, particular parking areas, particular airport, train, or bus terminals, particular flight gates or train platforms, particular baggage claims, check-in counters, concierge services, concessions, restaurants, gift shops, etc., that are associated with a transportation hub. The traveler application may further be able to utilize proximity detection technology to estimate the location of the traveler and to provide the traveler with navigation information to one or more of these locations. In some implementations, a traveler's personal information or travel information may be accessible to the proximity detection system (e.g., using a traveler profile associated with the traveler), such that the proximity detection system can provide location-based services relating to the traveler's travel plans. For instance, the traveler application may be able to output a traveler's boarding pass when they are located near a security checkpoint or flight gate. Additionally, the traveler application may enable the traveler to check baggage, check-in to a flight, pick up baggage, etc., with greater ease based on the traveler application providing relevant information when the traveler is near areas associated with those activities. For example, the traveler application may output a traveler's check-in information (e.g., name, flight number, etc.) when the traveler approaches a check-in counter. The traveler application may then output a code associated with a user's baggage when they are near a baggage claim area, so that the user can more readily collect their baggage when they arrive at their destination. Such information may be presented at a display of the traveler's client device (e.g., as text or as a scannable barcode or quick read (QR) code), such that staff or administrators of the transportation hub may be able to more readily process travelers' check-ins, baggage claims, etc.

Additional location-based services can be provided to travelers. Such services may include providing notifications to travelers when they are near certain areas (e.g., near their flight gate) or may provide information relating to the locations of other travelers (e.g., other travelers in the traveler's group). For example, a traveler application may provide a traveler with information indicating the number of other travelers currently waiting to go through a security checkpoint, to check their bags, etc. Such information may be provided as an estimated wait time for going through security, checking bags, etc., so that the traveler may plan accordingly. In some implementations, the traveler application may provide suggestions to a traveler based on the information, for example, by suggesting the traveler use a particular security checkpoint based on determining that the wait time for that checkpoint is shorter than for other checkpoints. Additionally, the use of a traveler application can help a traveler locate or ensure that they are on the proper flight, train, bus, etc., or can help the travel locate or ensure that they are in the proper seat on a plane, train, bus, etc. For example, based on determining that a traveler is on the wrong flight, notifications can be provided to the traveler and/or one or more staff members or administrators to indicate that the traveler is on the wrong flight and should de-board the plane. Similarly, if a traveler is sitting in the wrong seat, the traveler can be provided with a notification, for example, at their client device or via a television screen associated with the seat that the traveler is sitting in, to indicate that the traveler is in the wrong seat and that they should move to the proper seat. In some implementations, two or more travelers that each have client devices hosting the traveler application can determine that they are located near one another (e.g., are seated next to one another), and can exchange contact information or otherwise interact, for example, by playing a game, viewing similar content, etc. Additionally, travelers using the traveler application may be able to use the application to purchase particular items, such as food, drinks, medicine, reading materials, etc., while traveling, such that a staff member using the administrative application may receive a purchase request from the traveler and can deliver the requested items to the traveler based on being provided with the traveler's location. Other uses for a traveler application may utilize features similar to those discussed with respect to the other described scenarios.

An administrative application for use in a transportation hub or vehicle can provide various features that leverage the location-based services provided by the proximity detection system. For example, an administrative application may enable the staff of an airline to determine that specific travelers have not yet boarded a flight based on determining that that the specific travelers' locations are not near the gate of the flight or are not near their seats on the plane. The administrative application may be able to provide a notification or other information to the traveler to notify them that they should proceed to their gate, or to suggest other action (e.g., in the event that they have missed their flight). Such a use case may have further applicability when travelers are connecting between flights, for example, to determine whether one or more particular travelers are on their way to the gate of their next flight, how close the travelers are to the gate of their next flight, etc.

Additionally, as described previously, location information may be aggregated across many travelers such that an administrator or staff member using an administrative application may be able to monitor the number or concentration of travelers within a transportation hub. For example, an administrator may be able to determine that a large number of travelers are approaching a particular security checkpoint, and the administrator may send additional security staff to address the surge in travelers at the security checkpoint before they arrive. Other uses for this location information are envisioned. For example, location information may be used to determine areas of congestion in a transportation hub, areas where additional staff may be needed, etc.

An administrative application can further be used to enhance the security of transportation hubs or of transportation vehicles. For example, the proximity detection system may be capable of tracking the locations of travelers or persons of interest based on the movements of their client devices within a transportation hub or their presence in various locations of a vehicle, e.g., their location in a plane, on a train, on a cruise ship, etc. Administrators and/or staff members may be able to "flag" certain travelers for various reasons, for example, if they require handicap assistance, appear suspicious, etc., such that the specific travelers can be tracked throughout a transportation hub or vehicle. In some implementations, administrators or staff may be provided with a graphic such as the graphic of FIG. 2 that indicates the locations of the flagged travelers, such that the staff or administrators may be able to discern the reason the travelers are flagged, where the flagged travelers are located, view additional information relating to the traveler or their travel plans, etc.

In some implementations, a proximity detection system may be capable of tracking the presence or movements of travelers over time, and can perform various analytics on the location data. For example, administrators or staff members having access to the administrative application may be able to track the flow of travelers through transportation hubs, may be able to determine an average amount of time travelers need to pass through security checkpoints, may be able to determine popular concessions, restaurants, gift shops, or other attractions or facilities within a transportation hub, etc. Additional analytics and uses for the location data collected by the proximity detection system described in association with other settings and scenarios may be adapted to a transportation hub or transportation vehicle setting.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:
1. A computer-implemented method comprising:
receiving, from each of a plurality of client devices, information indicating (i) a client identifier associated with a particular client device of the plurality of client devices, (ii) a beacon identifier associated with a wireless proximity beacon that is associated with a physical location within a space, and (iii) a proximity of the particular client device of the plurality of client devices to the wireless proximity beacon;

estimating, for each of the plurality of client devices, a physical location based at least on the received beacon information;

accessing region data that defines one or more regions of the space, wherein each region of the space is associated with boundaries that define the region of the space;

determining regions where each of the plurality of client devices is located within the space, based at least on (i) estimated physical locations of each of the plurality of client devices, and (ii) the region data that defines the one or more regions of the space;

determining, based at least on the determined regions where each of the plurality of client devices is located within the space, aggregate populations of client devices in the one or more regions of the space, wherein each of the aggregate populations comprises a different group of multiple client devices from the plurality of client devices; and generating a graphical representation that includes, for each of the determined aggregate populations of client devices in the one or more regions of the space, a density indicator that indicates a density of client devices currently present in an area of the space where the aggregate population is located, wherein generating the graphical representation comprises (i) determining a total number of client devices from the plurality of client devices at a point in time at a region from the one or more regions and (ii) determining a change in the total number of client devices from the plurality of client devices.

2. The computer-implemented method of claim 1, wherein the graphical representation indicates the estimated physical locations of each of the plurality of client devices in the determined aggregate populations of the client devices.

3. The computer-implemented method of claim 1, wherein generating the graphical representation indicating the determined aggregate populations of client devices within each of the one or more regions of the space further comprises:

displaying the total number of client devices from the plurality of client devices at the point in time at the region from the one or more regions on the graphical representation.

4. The computer-implemented method of claim 3, further comprising:

storing information indicating a total number of client devices from the plurality of client devices at one or more time periods at the region from the one or more regions; and displaying the total number of client devices from the plurality of client devices at the one or more time periods at the region from the one or more regions on the graphical representation.

5. The computer-implemented method of claim 1, further comprising:

determining a first movement of a first client device from the plurality of client devices from a first region to a second region from the one or more regions over a period of time;

determining a second movement of a second client device from the plurality of client devices from a first location to a second location in the first region over the period of time; and displaying the first movement of the first client device moving from the first region to the second region and the second movement of the second client device moving from the first location to the second location in the first region over the period of time on the graphical representation.

6. The computer-implemented method of claim 5, further comprising:

determining a direction of the first movement based on the estimated location of the first client device; and determining a rate of movement of the first movement based on the estimated location of the first client device.

7. The computer-implemented method of claim 5, wherein determining the first movement of the first client device comprises determining one or more acceptable paths for the first movement for the first client device to avoid one or more obstructions along the first movement.

8. The computer-implemented method of claim 1, wherein the graphical representation is an occupation density map representing the one or more regions and indicating a density of client devices currently occupying each of the one or more regions.

9. The computer-implemented method of claim 1, wherein the graphical representation includes, in addition to the density indicators, location indicators that respectively indicate locations of individual client devices of the plurality of client devices.

10. The computer-implemented method of claim 1, wherein the graphical representation is a map; and wherein, for at least one of the aggregate populations, the density indicator for the aggregate population covers an area of the map that encompasses the locations of each of the client devices in the aggregate population.

11. The computer-implemented method of claim 1, wherein the region data defines multiple regions of the space;

wherein identifying the aggregate populations of client devices comprises identifying, for each of the multiple regions of the space, an aggregate population of client devices located in the region of the space; and wherein the density indicators respectively indicate densities of client devices for the multiple regions, each of the respective density indicators indicates the density of client devices in a respective single region of the multiple regions.

12. The computer-implemented method of claim 1, wherein the density indicators differ in appearance that distinguish areas having different densities of client devices.

13. The computer-implemented method of claim 1, wherein the region data defines multiple regions of the space, and wherein at least one of the density indicators spans at least two of the multiple regions.

14. A system comprising:

one or more computers and one or more storage devices storing instructions that are operable, when executed by the one or more computers, to cause the one or more computers to perform operations comprising:

receiving, from each of a plurality of client devices, information indicating (i) a client identifier associated with a particular client device of the plurality of client devices, (ii) a beacon identifier associated with a wireless proximity beacon that is associated with a physical location within a space, and (iii) a proximity of the particular client device of the plurality of client devices to the wireless proximity beacon;

estimating, for each of the plurality of client devices, a physical location based at least on the received beacon information;

accessing region data that defines one or more regions of the space, wherein each region of the space is associated with boundaries that define the region of the space;

determining regions where each of the plurality of client devices is located within the space, based at least on (i) estimated physical locations of each of the plurality of client devices, and (ii) the region data that defines the one or more regions of the space;

determining, based at least on the determined regions where each of the plurality of client devices is located within the space, aggregate populations of client devices in the one or more regions of the space, wherein each of the aggregate populations comprises a different group of multiple client devices from the plurality of client devices; and generating a graphical representation that includes, for each of the determined aggregate populations of client devices in the one or more regions of the space, a density indicator that indicates a density of client devices currently present in an area of the space where the aggregate population is located, wherein generating the graphical representation comprises (i) determining a total number of client devices from the plurality of client devices at a point in time at a region from the one or more regions and (ii) determining a change in the total number of client devices from the plurality of client devices.

15. The system of claim 14, wherein the graphical representation indicates the estimated physical locations of each of the plurality of client devices in the determined aggregate populations of the client devices.

16. The system of claim 14, wherein generating the graphical representation indicating the determined aggregate populations of client devices within each of the one or more regions of the space further comprises:

displaying the total number of client devices from the plurality of client devices at the point in time at the region from the one or more regions on the graphical representation.

17. The system of claim 14, further comprising:

determining a first movement of a first client device from the plurality of client devices from a first region to a second region from the one or more regions over a period of time;

determining a second movement of a second client device from the plurality of client devices from a first location to a second location in the first region over the period of time; and displaying the first movement of the first client device moving from the first region to the second region and the second movement of the second client device moving from the first location to the second location in the first region over the period of time on the graphical representation.

18. One or more non-transitory computer-readable media storing software comprising instructions executable by one or more computers which, upon such execution, cause the one or more computers to perform operations comprising:

receiving, from each of a plurality of client devices, information indicating (i) a client identifier associated with a particular client device of the plurality of client devices, (ii) a beacon identifier associated with a wireless proximity beacon that is associated with a physical location within a space, and (iii) a proximity of the particular client device of the plurality of client devices to the wireless proximity beacon;

estimating, for each of the plurality of client devices, a physical location based at least on the received beacon information;

accessing region data that defines one or more regions of the space, wherein each region of the space is associated with boundaries that define the region of the space;

determining regions where each of the plurality of client devices is located within the space, based at least on (i) estimated physical locations of each of the plurality of client devices, and (ii) the region data that defines the one or more regions of the space;

determining, based at least on the determined regions where each of the plurality of client devices is located within the space, aggregate populations of client devices in the one or more regions of the space, wherein each of the aggregate populations comprises a different group of multiple client devices from the plurality of client devices; and generating a graphical representation that includes, for each of the determined aggregate populations of client devices in the one or more regions of the space, a density indicator that indicates a density of client devices currently present in an area of the space where the aggregate population is located, wherein generating the graphical representation comprises (i) determining a total number of client devices from the plurality of client devices at a point in time at a region from the one or more regions and (ii) determining a change in the total number of client devices from the plurality of client devices.

19. The one or more non-transitory computer-readable media of claim 18, wherein the graphical representation indicates the estimated physical locations of each of the plurality of client devices in the determined aggregate populations of the client devices.

20. The one or more non-transitory computer-readable media of claim 18, wherein generating the graphical representation indicating the determined aggregate populations of client devices within each of the one or more regions of the space further comprises:

displaying the total number of client devices from the plurality of client devices at the point in time at the region from the one or more regions on the graphical representation.

* * * * *